FIG. 2
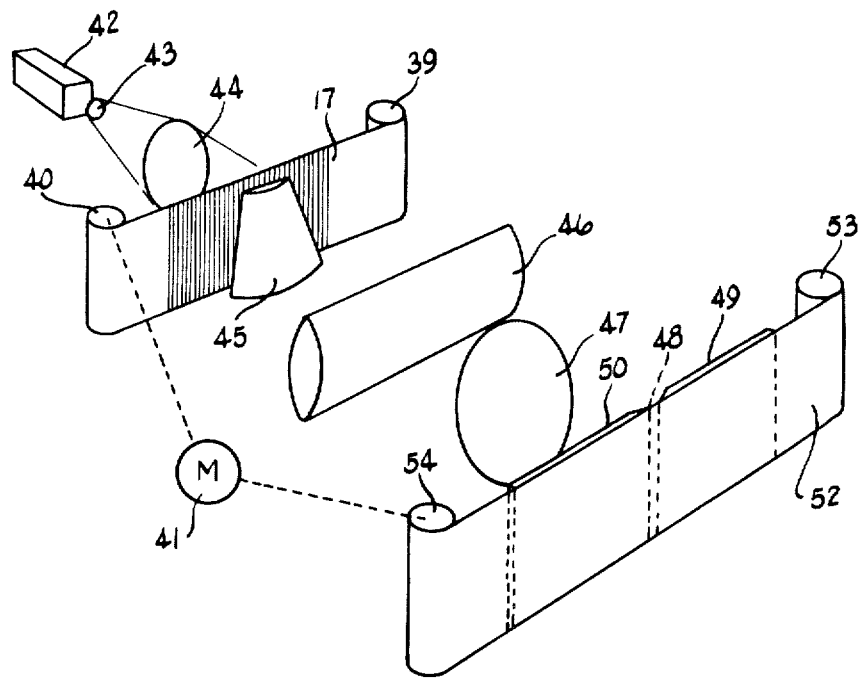
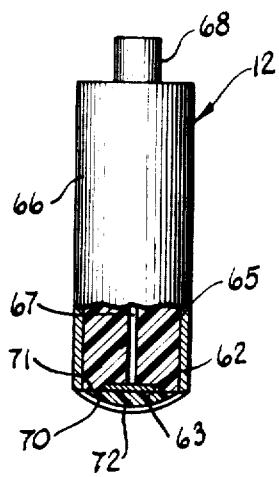
FIG. 6
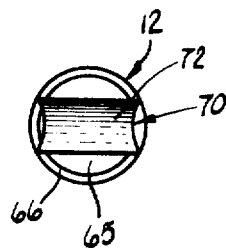
FIG. 7
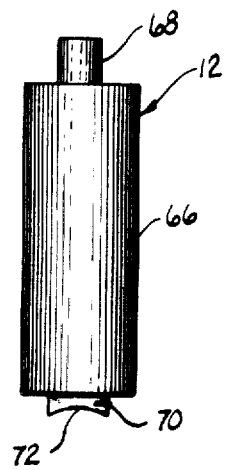
FIG. 8
INVENTORS
JOHN J. FLAHERTY
KENNETH R. ERIKSON
VAN METRE LUND
ATTORNEYS Dec. 22, 1970 — J. J. FLAHERTY ET AL — 3,548,642
SYNTHETIC APERTURE ULTRASONIC IMAGING SYSTEMS
Filed March 2, 1967 — 12 Sheets-Sheet 3

INVENTOR
JOHN J. FLAHERTY
KENNETH R. ERIKSON
VAN METRE LUND

ATTORNEYS

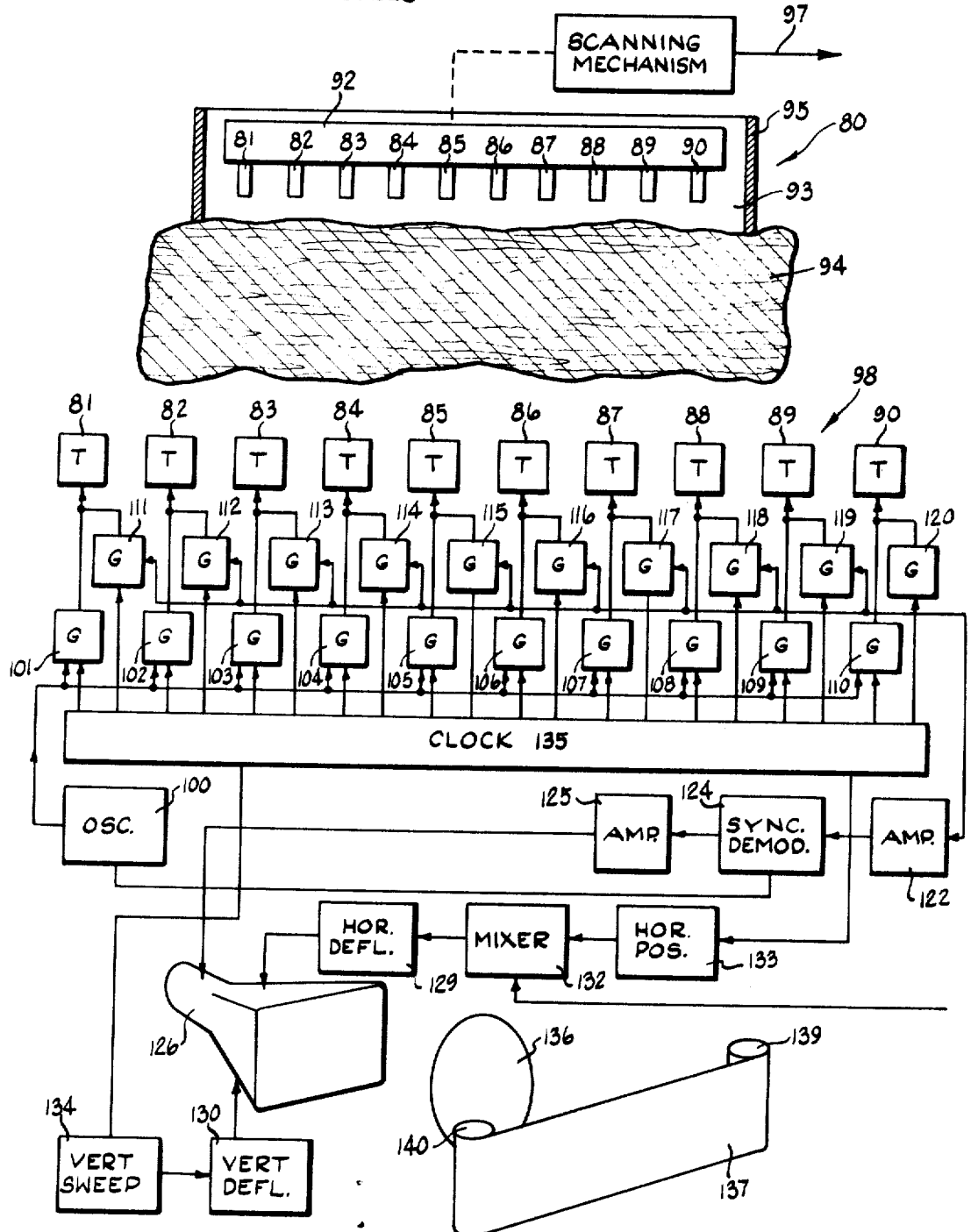

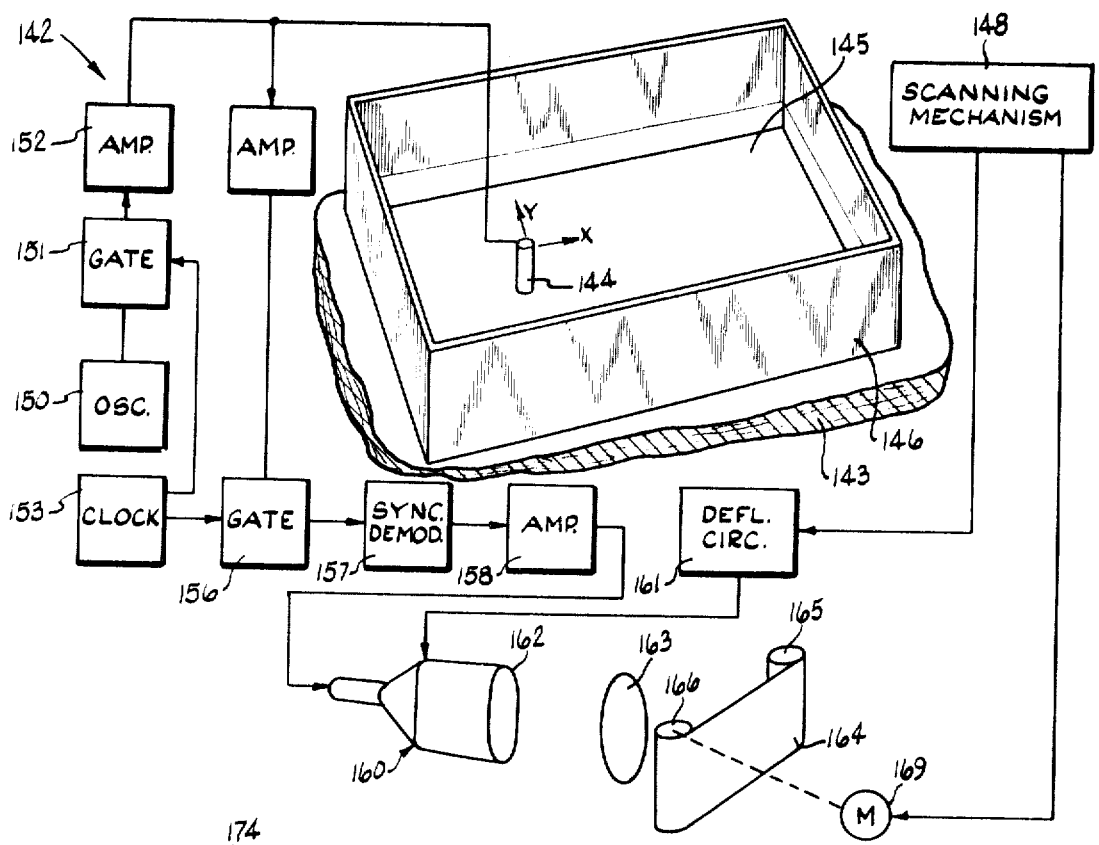
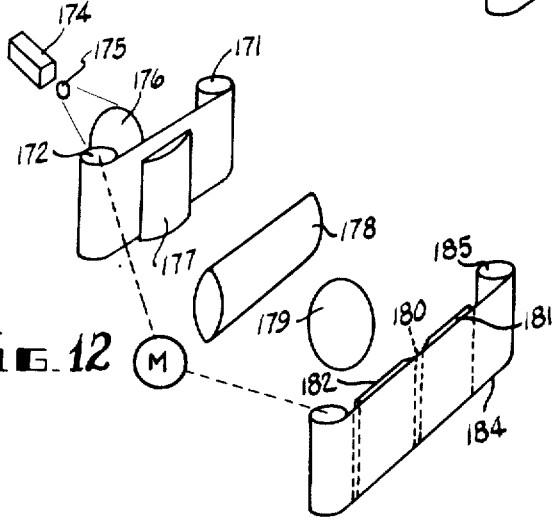
FIG. 11
FIG. 12

Dec. 22, 1970   J. J. FLAHERTY ET AL   3,548,642
SYNTHETIC APERTURE ULTRASONIC IMAGING SYSTEMS
Filed March 2, 1967   12 Sheets-Sheet 6
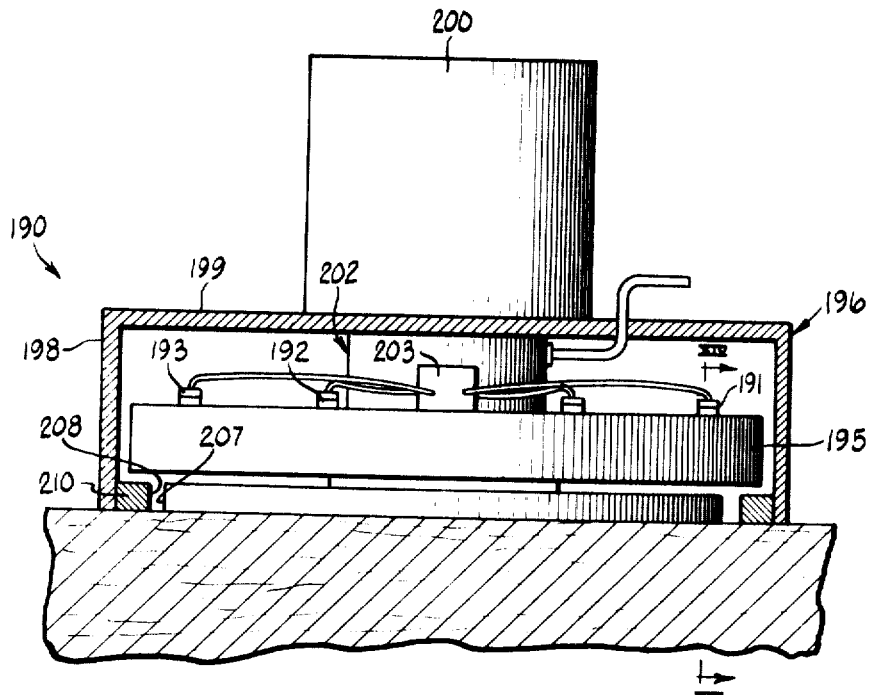
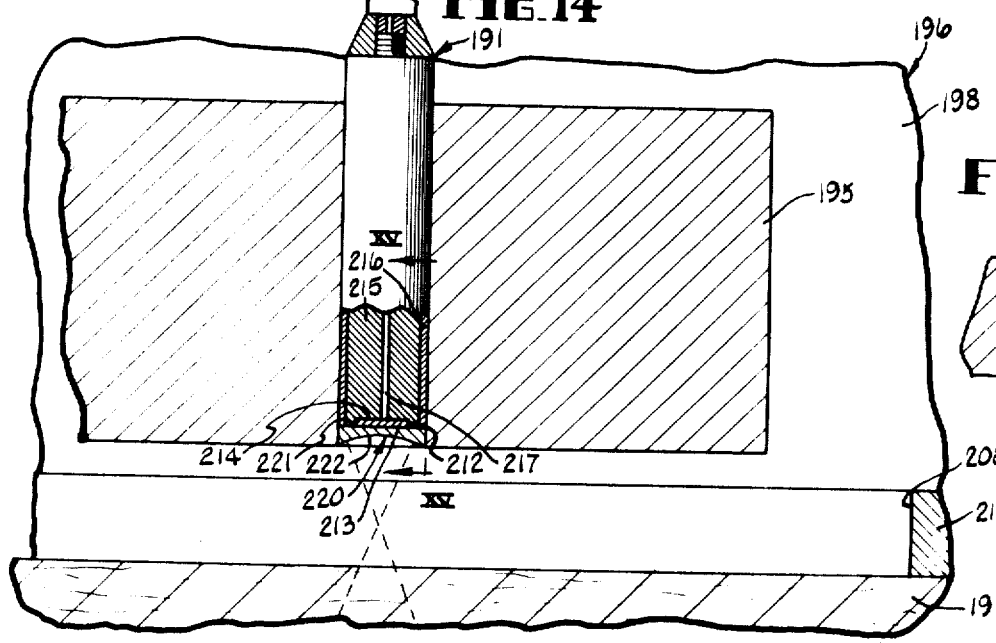
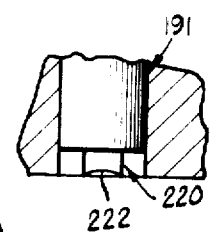
INVENTORS
JOHN J. FLAHERTY
KENNETH R. ERIKSON
VAN METRE LUND
ATTORNEYS

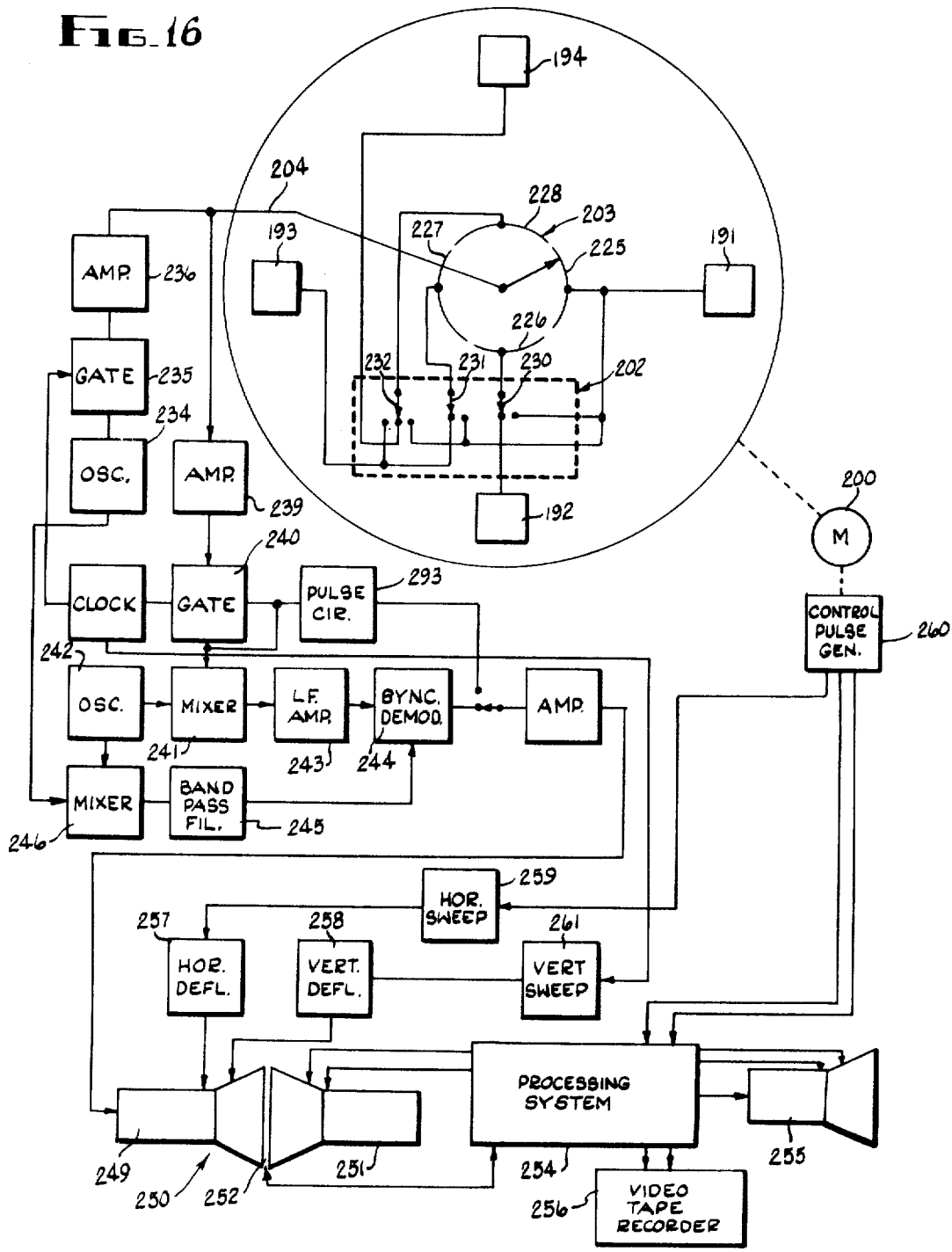

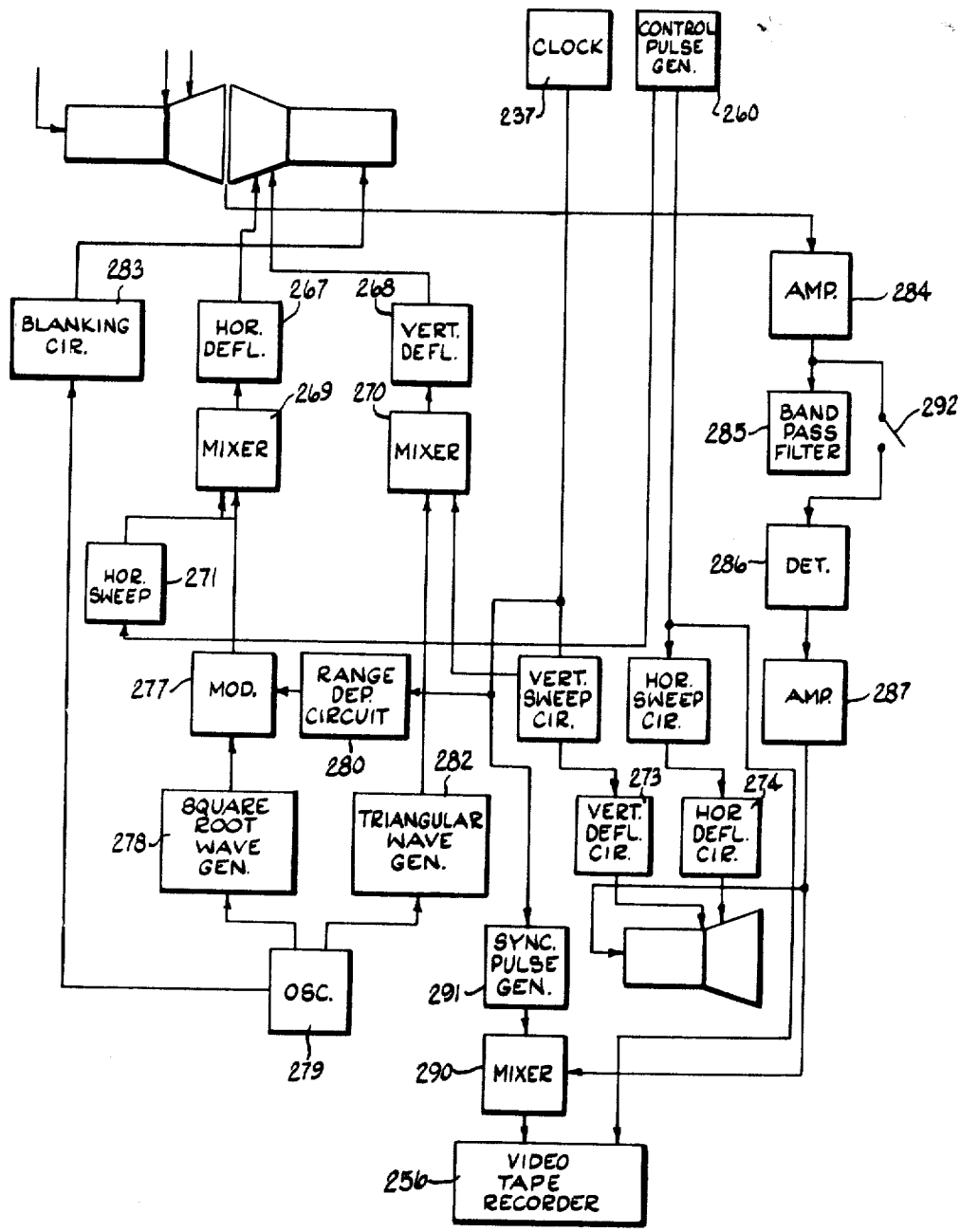

INVENTORS
JOHN J. FLAHERTY
KENNETH R. ERIKSON
VAN METRE LUND

ATTORNEYS

INVENTORS
JOHN J. FLAHERTY
KENNETH R. ERIKSON
VAN METRE LUND

ATTORNEYS

INVENTORS
JOHN J. FLAHERTY
KENNETH R. ERIKSON
VAN METRE LUND

ATTORNEYS

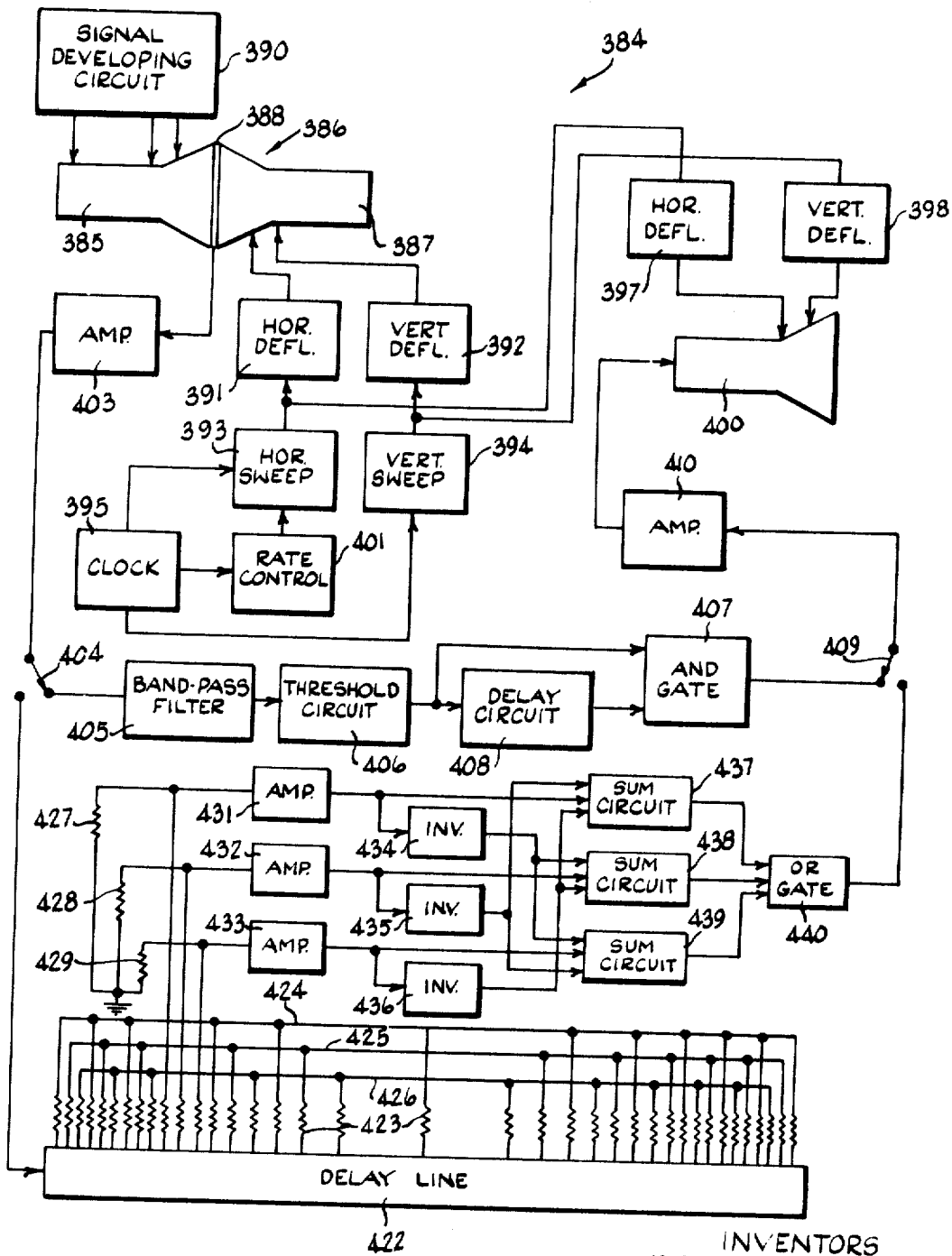

United States Patent Office 3,548,642
Patented Dec. 22, 1970

3,548,642
SYNTHETIC APERTURE ULTRASONIC IMAGING SYSTEMS
John J. Flaherty, Elk Grove Village, Kenneth R. Erikson, Niles, and Van Metre Lund, Chicago, Ill., assignors to Magnaflux Corporation, Chicago, Ill., a corporation of Delaware
Filed Mar. 2, 1967, Ser. No. 620,041
Int. Cl. G01n 29/00
U.S. Cl. 73—67.5      46 Claims

ABSTRACT OF THE DISCLOSURE

Ultrasonic systems for developing high resolution indications of the characteristics of a narrow slice-like region of a body in which bursts of ultrasonic energy are transmitted with signals reflected from the region to a multiplicity of receiving locations being stored, the signals with respect to each reflecting point being stored in a certain pattern. Processing means are provided including means responsive to the pattern of signals stored with respect to each reflecting point to produce an indication at each point of a display area in accordance with the correlated and integrated effect of the signals received from the corresponding point of the region. In one type of system, the signals are stored on film and optical processing means are provided, preferably using a coherent light source. In another type of system, storage cathode ray tubes, image converters or the like are used.

---

This invention relates to ultrasonic testing systems and more particularly to ultrasonic testing wherein signals are correlated and integrated in a manner such as to obtain high resolution and accuracy in a very effective and reliable manner.

The systems of this invention were specifically designed for use in medical applications, for examination of the interior of living bodies, although it will be apparent that various features of the invention are applicable to the ultrasonic testing of any solid parts and other features are applicable to other types of systems as well.

Medical ultrasonic systems are known in the prior art and have been used with considerable success. A very important advantage of such systems is that they can be used with low energy levels such that there are no harmful effects on living tissues, as contrasted with the dangers associated with X-ray systems.

Improvements have been made in the resolution capabilities of prior ultrasonic systems by using certain techniques to focus ultrasonic energy into a narrow beam and by using higher frequency and short duration bursts of energy. Improvements in resolution have also been accomplished through the use of special scanning arrangements and particularly compound scanning arrangements. Even with such improvements, the resolution has not been as good as would be desirable and it has not always been easy to obtain indications from which a reliable interpretation or diagnosis can be obtained.

This invention is based in part upon the concept that techniques similar to those suggested for use in other fields might be applied to advantage in ultrasonic testing. Of particular interest are discussions in prior literature of the application of coherent optical processing techniques to radar systems and of experimental results which indicate the attainment of resolution capabilities which are much superior to those obtained with prior radar systems. The prior literature has described generally the use of a sideview radar system in which an antenna is carried by an airplane to a sequence of positions to form the equivalent of a long multi-element antenna and to form a "synthetic aperture." The literature has further described the theoretical and mathematical considerations involved in processing the radar signals and although the details have not been described, the use of a coherent optical system with special lenses has been suggested.

With regard to synthetic aperture radar systems, the concept involved may be best understood by first considering the operation of a conventional photographic camera lens which functions to receive energy from a scene and to form an image at the film plane, light from each point of the scene being passed through the lens to be focused at a corresponding point at the film plane. The lens gathers and resolves, correlates or integrates the energy from each point, the amount of energy being dependent upon the size of the effective aperture of the lens. The larger the aperture, the greater the resolution. Parabolic reflectors, multi-element arrays or other equivalents of the optical lens may be used in radar systems and the resolving power is determined by the size of the area or "aperture" over which the energy is gathered. The physical size required to obtain a desired resolution capability may, however, be quite large in radar systems and it has been proposed to synthetically attain the same results by carrying a relatively small antenna on an airplane while gathering and storing information received by the antenna. The stored information is thereafter processed to perform the correlation or integration. Thus, a large effective aperture size is obtained synthetically without requiring a large physical structure.

There are, of course, significant differences between radar systems and ultrasonic systems. Radar systems involve the transmission of radio waves into the atmosphere to be reflected by airplanes and by building or other projections from the earth's surface. In travelling from the antenna to and from the reflecting surfaces, the radio waves travel through an atmosphere which is substantially homogeneous whereas in ultrasonic systems and especially in those involving the examination of an interior region of a body such as a living body, the ultrasonic waves travel through a non-homogeneous medium before reaching a reflecting surface in a region under investigation. In addition, radio waves are electromagnetic waves which travel at substantially the speed of light (300,000,000 meters per second), whereas ultrasonic waves are compressional waves which travel at a comparatively low velocity (approximately 1,500 meters per second in water). Further, the methods of propagation of the waves are entirely different, radio waves being emanated by applying an electric current to antenna elements of conductive material whereas ultrasonic waves are generated by causing a mechanical vibration of a piezoelectric plate or the like. Coupling problems are involved in transmission of ultrasonic waves into a region to be examined which are not presented in radar systems.

Nevertheless, an analysis shows that certain of the problems involved in obtaining good resolution are present in both radar and ultrasonic systems. In both systems, energy is transmitted to a region under investigation to be reflected by interfaces within the region, and in both systems there are problems involved in attempting to focus energy into a narrow beam. An analysis further shows that in both systems, phase and frequency or Doppler shifts are encountered of a similar nature.

This invention involves the application to ultrasonic testing of principles similar to those suggested for use in radar systems and also involves the provision of features which provide solutions of problems involved in the application of such principles to ultrasonic testing. The invention additionally involves the provision of other novel features which are usable both in ultrasonic testing and in other types of testing applications.

According to an important feature of this invention, transducer means are arranged for transmitting ultrasonic energy into a region and for developing received signals in response to waves reflected from points within the region to an area forming a synthetic aperture and storage and processing means are provided to respond to the received signals for developing signals corresponding to the position of reflecting points within the region. Preferably, the region is located within a substantially solid body and the system is particularly advantageous in that the body may be a body such as a living body having non-homogeneous portions between the transducer means and the region which is inspected.

According to a specific feature of the invention, the transducer means are arranged for transmitting bursts of ultrasonic energy into the region and to receive reflected waves at a multiplicity of locations in spaced relation within the synthetic aperture area. In one type of arrangement, a transducer is movable along a line and is arranged to both transmit and receive reflected waves at each of the locations. The line of movement may either be a straight line or a curved line which extends arcuately about a certain center. In a second type of arrangement, a plurality of transducers are arranged in spaced relation along a line to receive reflected waves at a plurality of locations therealong. In the second type of arrangement, the transducers may be fixed or may be movable, preferably with a reciprocable movement through a distance less than the spacing between the transducers.

In accordance with a further feature, the storage and processing means comprises means for storing the received plurality of signals in accordance with the position and velocity of the locations relative to the region under investigation and in accordance with the relative time relation of the received signals with respect to the transmitted bursts of ultrasonic energy, with the stored signals being processed to produce output signals corresponding to the positions of reflecting points within the region. Each output signal represents a correlated and integrated effect of ultrasonic waves reflected to the locations from a certain point within the region, so as to permit the attainment of extremely high resolution.

According to another important feature of the invention, the directional sensitivity of the transducer means is such that reflected ultrasonic waves are received at each of the locations through a wide angle with waves reflected from any point within the region being received at several of the locations. With this feature, a number of received signals can be integrated and correlated to obtain the improved resolution capabilities.

In accordance with a further important feature, the region inspected has a long dimension in a direction parallel to a line through the reception locations and means are provided for limiting the effective directional sensitivity of the transducer means to limit the region to a relatively short dimension in a direction transverse to the long dimension. This feature is particularly important in an ultrasonic system used to inspect a body such as a living body which is non-homogeneous with reflecting inner faces distributed throughout the entire body. By limiting the effective directional sensitivity of the transducer means in a transverse direction, it is possible to examine a narrow "slice" of the body and to obtain indications which can be readily interpreted and from which a reliable diagnosis can be obtained.

Another very important feature of the invention is in the limitation of the size of the reception locations to a dimension on the same order of magnitude as ten wavelengths or less at the frequency of the transmitted energy. With this feature, it is possible to minimize phase distortions and to obtain a much more accurate correlation of the received signals.

More specific features of the invention relate to particular types of transducer constructions and to means for supporting transducers for movement, to obtain signals with a high degree of efficiency and accuracy, such as to permit precise correlation and integration thereof.

Further important features of the invention relate to the storage and processing of the signals received by the transducer means. In general, signals are stored on a storage medium in a manner such that the reflection of ultrasonic waves from each point within the region inspected produce a certain pattern of signals on the storage medium, and the processing means operate to compare the signals stored on the storage medium with a reference, to produce an output signal in response to storage of signals according to the pattern, as determined from the reference. The systems operate to perform integral transform operations with a large number of stored signals being cross-correlated and integrated in a manner such as to obtain a high resolution, while noise and extraneous signals are effectively filtered out to produce minimal effects.

All of the systems of the invention involve the use of electronic apparatus and in certain of the systems, the storage and processing is performed essentially through electronics as by use of storage cathode ray tubes, image convertors and the like. In other systems, a photographic film is used as a storage medium and processing is carried out by means of optical systems which preferably utilize coherent light sources. The electronic types of systems are more versatile in many respects and do not require film processing so that output indications can be obtained in a very short time. The optical systems are simpler in many respects and capable of achieving a high degree of accuracy.

It is again noted that although the systems were specifically designed for ultrasonic testing and particularly for medical applications, many of the features of the invention are not limited to such testing but can be used in other types of ultrasonic systems. Certain features of the invention are usable in non-ultrasonic applications, such as in radar systems, for example.

This invention contemplates other objects, features and advantages which will become more fully apparent from the following detailed description taken in conjunction with the accompanying drawings which illustrate preferred embodiments and in which:

FIG. 2 is a schematic diagram of a processing portion of the system, usable for processing a film developed by the signal developing and storage portion of FIG. 1;

FIG. 6 is a front elevational view, partly in section and on an enlarged scale, of a transducer of the portion of the system shown in FIG. 1;

FIG. 7 is a bottom plan view of the transducer of FIG. 6;

FIG. 8 is a side elevational view of the transducer of FIG. 6;

FIG. 9 is a view illustrating a modified transducer system, using a plurality of transducers;

FIG. 10 is a schematic diagram illustrating an electronic system usable with the transducer arrangement of FIG. 9;

FIG. 11 is a schematic diagram of a signal developing and storage portion of a modified ultrasonic system, usable for producing a C-scan indication;

FIG. 12 is a schematic diagram of a processing portion of the modified system;

FIG. 13 is a view illustrating another modified transducer arrangement;

FIG. 14 is a sectional view taken substantially along line XIV—XIV of FIG. 13;

FIG. 15 is a sectional view taken substantially along line XV—XV of FIG. 14;

FIG. 16 is a schematic diagram of a modified system usable with the transducer arrangement of FIGS. 13–15;

FIG. 17 is a schematic diagram of a processing portion of the system of FIG. 16;

FIG. 24 is a schematic diagram of a modified form of processing arrangement;

Figure 1:
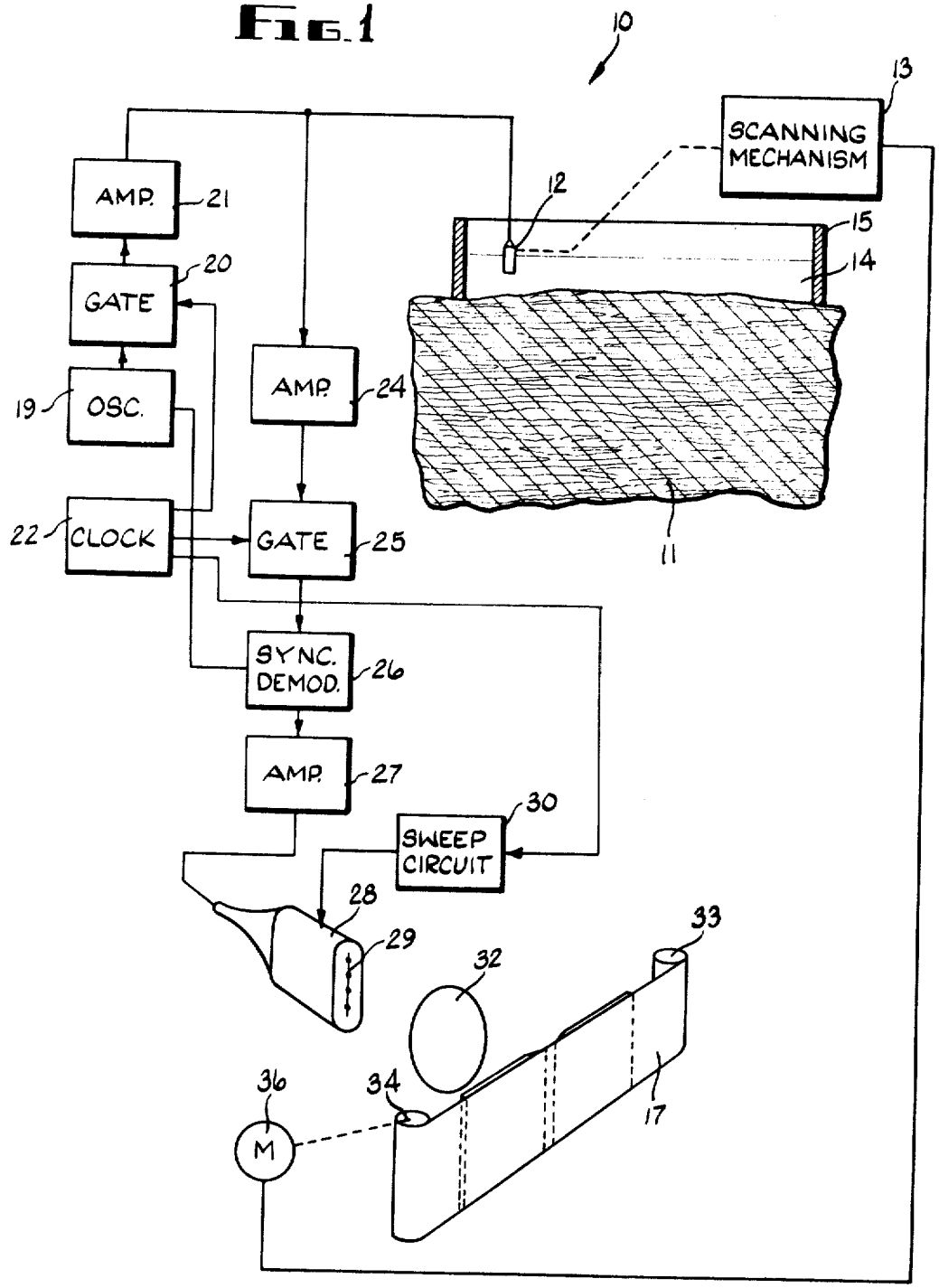
FIG. 1 is a schematic diagram of a signal developing and storage portion of an ultrasonic system constructed according to the principles of this invention.

Referring to FIG. 1, reference numeral 10 generally designates a signal developing and storage portion of an ultrasonic system constructed according to the principles of this invention. The illustrated system 10 is designed for testing a portion of a body 11 which may be a living human body, for example. An ultrasonic transducer 12 is provided for transmitting bursts of energy into the body 11 and for developing received signals in response to echoes from inner faces within the body. The transducer 12 is moved by a scanning mechanism 13 over the surface of the body 11, preferably in a linear path generally parallel to the surface of the body 11. To provide good acoustic coupling, the transducer 12 extends downwardly into a pool of liquid 14, preferably water, which is contained on the surface of the body 11 by the wall of a surrounding member 15 engaged with the body surface.

As the transducer 12 is moved over the body surface, electrical signals are developed which are converted to light signals and recorded on a film 17. The film 17 is then developed and the developed film is then processed by an optical processing system shown in FIG. 2, to develop final output signals which may be recorded on film, as hereinafter described. The final product of the system is a picture showing a cross-section of the region of the body examined, and particularly showing the location of any interfaces within the body which will reflect ultrasonic waves. By way of example, a picture may be produced showing an outline of the outer surface of an organ such as the liver, heart or kidney and the location of inner walls or membranes of the organ. Information can be obtained which cannot be obtained with other types of testing systems and the intensity of the ultrasonic waves is very low so that no harmful effects are produced even with prolonged exposure.

To energize the transducer 12, an oscillator 19 is connected through a gate 20 and through an amplifier 21 to the transducer 12, the gate 20 being periodically opened for a short time interval by a signal applied from a clock 22. By way of example, and not by way of limitation, the oscillator may be operated at 5 mHz. and the gate 20 may be opened for a time interval of 4 microseconds at a rate of 4000 times per second, so that each wave train transmitted by the transducer 12 will contain 20 cycles at the frequency of 5 mHz.

Received signals developed by the transducer 12 are applied through an amplifier 24 and through a gate 25 to a synchronous demodulator 26 which is supplied with a signal from the oscillator 19. The gate 25 is controlled from the clock 22 to be opened following transmission of each burst of energy, for a time interval corresponding to the depth of the region to be inspected. By way of example, the gate 25 may be opened for a time interval such as to permit inspection of a region from a distance of one inch to a distance of six inches from the transducer 12. The synchronous demodulator 26 operates to compare the phase of the received signal with a reference signal from the oscillator to develop an output signal which has a maximum amplitude when the applied signals are in phase, a minimum amplitude when the applied signals are out of phase and an intermediate amplitude when the signals are in 90 degree phase relation. The output of the synchronous demodulator 26 is applied through an amplifier 27 to a cathode ray tube 28 to control the intensity of a spot produced on a screen 29 of the cathode ray tube 28. The spot is deflected in a vertical direction by a sweep circuit 30 which is supplied with a synchronizing signal from the clock 22 and which applies a saw-tooth control signal to the deflection system of the cathode ray tube 28. A scan line is produced on the face or screen 29 of the cathode ray tube 28, the intensity of the spot being controlled in accordance with the output of the synchronous demodulator 26.

A lens 32 is provided for imaging the scan line produced on the screen 29 on the film 17. The film 17 is moved from a supply reel 33 to a take-up reel 34 which is driven by a motor 36. The film 17 is moved at a rate proportional to the movement of the transducer 12 and a synchronizing connection may be provided between motor 36 and the scanning mechanism 13, as diagrammatically illustrated by the line 37.

After performing one or more scanning operations, the film 17 is developed and after developing, the film 17 is inserted in a processing portion of the system shown in FIG. 2.

In the processing portion of the system, the film 17 is moved from a supply reel 39 to a take-up reel 40 which is driven by a motor 41. A portion of the film 17 between the reels 39 and 40 is exposed to parallel coherent light rays which, as diagrammatically illustrated, are developed from a laser light source 42 and applied through lenses 43 and 44. Light rays passing through the film 17 pass through a conical lens 45, a cylindrical lens 46 and a spherical lens 47 to pass through a slit 48 between plates 49 and 50 and to impinge on a film 52 which travels from a supply reel 53 to a take-up reel 54, driven by the motor 41.

The optical processing system operates to cross correlate and integrate signals recorded on a length of the film 17 when it is exposed to the parallel rays of coherent light and to produce a light intensity along the slit 48 which has bright spots corresponding to the position of reflecting points along a very narrow vertical path through a region of the body, such bright spots being recorded photographically on the film 52. Both films 17 and 52 are moved in unison by the motor 41 and as a result, a "B-scan" signal pattern is recorded on the film 52 which accurately corresponds to a cross-sectional view of the region of the body which is inspected. After exposure, the film 52 is developed and the developed film may be either examined directly or used to make contact prints or enlargements for examination. With the initial scanning of the body by the transducer being performed at a rapid rate, the film 52 could also be run through a motion picture projector, which is highly desirable in the examination of moving objects such as, for example, the heart.

To explain the operation of the system, it may be assumed that a single reflecting point is in the region of the body being inspected at a distance $R_0$ from the path of movement of the trannsducer 12 with the distance of movement of the transducer along the path being defined by X, X being equal to 0 when a line between the transducer and the point target is normal to the path of movement of the transducer 12. As X increases, the distance to the target will be increased by a distance $R_X$ and since the square of the hypotenuse of a right triangle is equal to the sum of the squares of the sides, and:

$$(R_0+R_X)^2 = R_0^2 + X^2$$

and $$R_0^2 + 2R_X R_0 + R_X^2 = R_0^2 + X^2$$

If $R_X$ is small in relation to $R_0$, the term $R_X^2$ is insignificant and, approximately, it follows that:

$$2R_X R_0 = X^2$$

$$R_X = \frac{X^2}{2R_0}$$

and $$X = \sqrt{2R_0 R_X}$$

The phase of received echo signals varies in direct proportion to the change ($R_X$) in the distance to the point target and the frequency of the received echo signals is also changed in proportion to a component of the transducer velocity, according to the Doppler principle. The frequency may also be considered as being changed as a first derivative with respect to time of the change in phase.

The following operating conditions may be assumed:

(1) A transmitted wave train having a duration of 4 microseconds and an effective frequency of 5 mHz., each wave train thereby containing 20 cycles.

(2) A pulse rate of 4000 pulses per second.

(3) A transducer scanning velocity at the rate of 40 inches per second.

(4) A point target at a distance of 3 inches from the path of movement of the transducer 12 ($R_0 = 3$ inches).

(5) Film 17 moved at a speed of 40 inches per second.

Assume that a pulse $P_0$ is transmitted when the transducer is at the position where $X$ is equal to 0, the pulse being reflected back from the point target to produce an echo $E_0$ and that consecutive pulses $P_1$, $P_2$, $P_3$, etc. are transmitted to produce corresponding echoes $E_1$, $E_2$, $E_3$, etc.

To within a very close approximation, the start of the echo $E_0$ will be delayed from start of the transmitted pulse $P_0$ by a time equal to twice the distance $R_0$ to the target, divided by the velocity of wave propagation which may be assumed to be approximately $6 \times 10^4$ inches per second. The delay is thus computed as follows:

$$\text{Delay} = \frac{2 \times 3}{6 \times 10^4} = \frac{1}{10^4} = 100 \text{ microseconds}$$

During the delay of 100 microseconds, the transducer will travel a distance equal to the delay time multiplied by the speed of travel of the transducer. This is calculated to be 0.004 inch which is very small in relation to the distance travelled to the target and back and only a very small component of this distance is in a direction which increases the distance travelled by the wave train. Accordingly, the effect of the increased distance is negligible in this instance.

Now consider a pulse $P_{10}$ transmitted 2.5 milliseconds after the initial pulse $P_0$. The transducer will have travelled 0.1 inch. The delay in this case is 100 microseconds plus an additional delay from the increased distance $R_X$, the additional delay being equal to twice the increased distance $R_X$ divided by the speed of propagation, calculated as follows:

$$\text{Additional delay} = \frac{2R_X}{C} = \frac{X^2}{R_0 C}$$

$$= \frac{(0.1)^2}{3 \times 6 \times 10^4}$$

$$= 5.55 \times 10^{-8} \text{ seconds}$$

$$= 55.5 \text{ millimicroseconds}$$

Considering that the duration of one cycle at the frequency of 5 MHz. is equal to 200 millimicroseconds, the additional delay of 55.5 millimicroseconds produces a phase shift of approximately 100 degrees, or slightly more than a quarter of a cycle.

Continuing this analysis, it is found that the phase shift of echo $E_{13}$ is nearly equal to 180 degrees and that the phase shift of echo $E_{14}$ is slightly more than 180 degrees. The phase shift of echo $E_{19}$ is almost exactly equal to 360 degrees so that at this point, the echo signal comes back in phase with the transmitted signal. As the transducer continues in its movement, out-of-phase and in-phase conditions are progressively produced with the time interval from one in-phase condition to the next being progressively reduced according to a square foot function as the distance X increases.

The synchronous demodulator 26 produces an output corresponding to the phase difference between the echo signals and the transmitted signals, all of the transmitted signals being in phase with the signals applied by the oscillator 19. Preferably, although not absolutely essential to the operation of the system, the synchronous demodulator 26 is operated against a bias level such that with not input signal being applied, the output of the demodulator is at a certain level with a higher level being developed in response to in-phase signals and a lower level being developed in response to out-of-phase signals.

Figure 3:
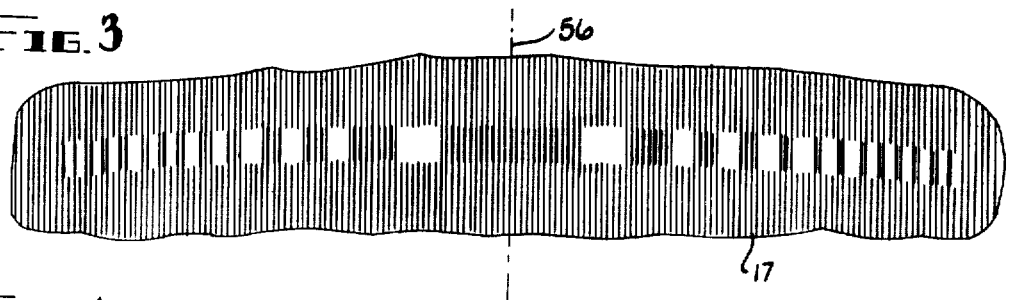
FIG. 3 is an enlarged view of a portion of a section of film, illustrating a pattern produced in response to a single point in a region under inspection.

When the output so developed by the synchronous demodulator 26 is applied through the amplifier 27 to the intensity control electrode of the cathode ray tube 28, a series of bright spots may be produced in response to out-of-phase conditions while a series of dark spots may be produced in response to in-phase conditions, the spot being of an intermediate intensity when there is a 90 degree phase relation, or when no input signal is received. With movement of the film 17, a series of scan lines are placed in side-by-side relation on the film 17 and when the film 17 is developed, a pattern such as shown in FIG. 3 is developed in response to the reflected signals from a single point under the assumed conditions. FIG. 3 is an enlargement of the pattern and, for example, the actual size of the pattern may be possibly one-fifth of the size illustrated in FIG. 3.

It will be noted that the pattern is symmetrical about a center plane indicated by reference numeral 56 which is transverse to the plane of the film and there are a series of spaced transparent areas which are progressively closer together, according to a square root function, as the distance from the center plane 56 increases. The transparent areas are separated by substantially opaque areas.

Figure 4:
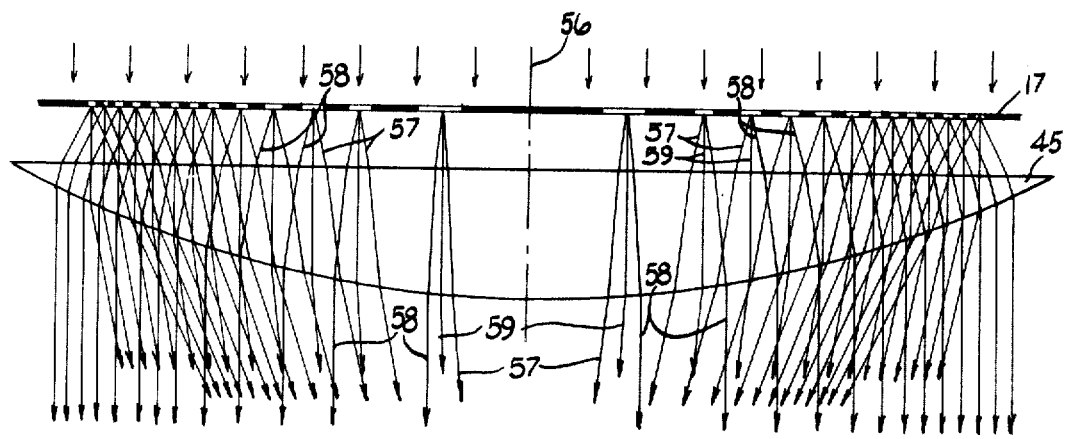
FIG. 4 is a schematic diagram illustrating the portion of the film shown in FIG. 3 in section and illustrating the operation of a lens of the system.

FIG. 4 shows diagrammatically the effect of exposure of the developed film 17 to parallel coherent light. At each transparent area of the film, a component of the light will pass straight through the area but due to diffraction effects, components will be produced which are directed both inwardly and outwardly toward and away from the center plane 56. The inwardly directed components included rays travelling along lines 57 and referred to as "real image" rays. In the absence of the lens 45, such rays would arrive in phace at a point at a certain focal distance in front of the film plane and in the center plane 56. To arrive in phase at the focal point, the distances from all transparent areas to the focal point must differ by integer multiples of one wavelength of the light and the location of the transparent areas in the pattern is such that this condition is obtained. Similarly, the distances from the opaque areas to the focal point must equal an odd integer number of half wavelengths and the opaque areas thus serve to prevent the arrival at the focal point of rays in out-of-phase relation to the waves coming from the transparent areas.

The outwardly directed components include rays travelling along line 58, referred to as "virtual image" rays. The virtual image rays may be considered as having been emanated from a virtual image focal point on the center plane 56 and spaced behind the film plane a distance equal to the spacing of the real image focal point in front of the film plane. The rays which are not refracted and which pass directly through the film plane are referred to as straight-through rays and are indicated by reference numeral 59. To determine the distance from the film plane to the real and virtual image focal points, formulas equivalent to those set forth above may be used. Under the assumed conditions, the distance from the center plane 56 to the first opaque area is 0.19 inch or 4.83 millimeters and the focal distance ($R_0$) is calculated as follows:

$$R_0 = \frac{X^2}{2R_X} = \frac{(4.83)^2}{2R_X} = \frac{11.7}{R_X}$$

The delay distance $R_X$ in this case must equal one wavelength at the frequency of the light. Assuming a wavelength of 6,328 Angstroms or $6.328 \times 10^{-4}$ millimeter, $R_0$ is calculated as follows:

$$R_0 = \frac{11.7}{R_X} = \frac{11.7}{6.328 \times 10^{-4}}$$

$$= 1.846 \times 10^{+4} \text{ mm. or } 18.46 \text{ meters}$$

In the operation of the illustrated lens system, the lens 45 refracts the virtual image rays 58 into parallel relation and thus focuses at infinity. It has a focal distance equal to the effective focal distance of the pattern on the film. The cylindrical lens 46 functions to refract waves in the range direction to image all waves to infinity. The spherical lens 47 operates on the waves in both directions to focus at the plane of the film 52.

The film focal distance has a certain value in each range dimension, but varies with range, being proportional thereto. Thus the focal distance of a pattern produced from a reflecting point which is 3 inches from the transducer path may be 18.46 meters while the focal distance of a pattern produced from a reflecting point which is 6 inches from the transducer path may be 36.92 meters. To compensate, the lens 45 is a conical lens having a focal length which varies in direct proportion to its axial length.

It is noted that the lenses 45, 46 and 47 act to refract the real image rays 57 and also the straight-through rays 59, but such rays are not focused at the plane of the film 52 and thus have no effect.

Figure 5:
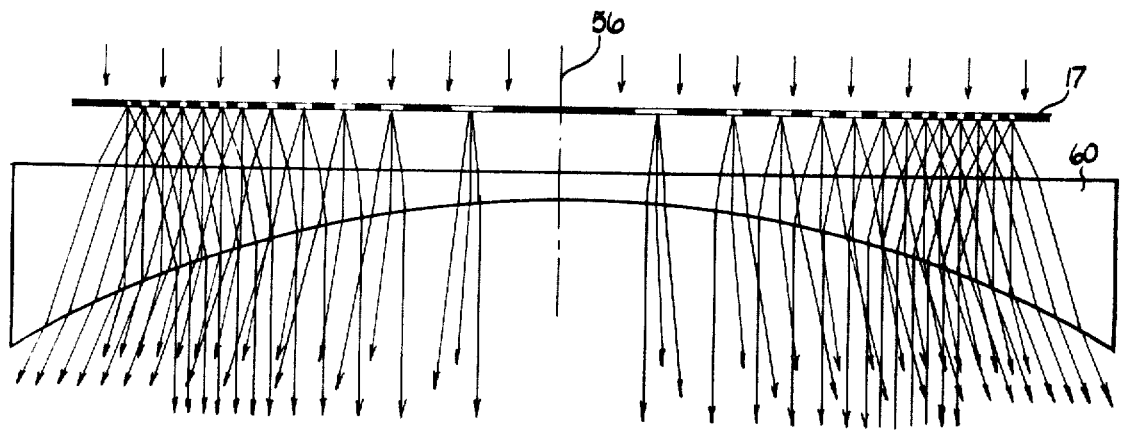
FIG. 5 is a view similar to FIG. 4, but illustrating the use of a different type of lens.

The lens 45 has a convex refracting surface as illustrated, in order to act on the virtual image rays 58. As shown in FIG. 5, it is possible to use a lens 60 having a concave refracting surface which operates to focus the real image rays to infinity and to thus permit the real image rays to be refracted by the lenses 46 and 47 to be focused at the plane of the film 52. The concave surface of the lens 60 should, of course, have a radius which varies with the range dimension.

Important features of the invention relate to the provision of transducer means having a directional sensitivity such as to permit the development of received signals with a high degree of precision, such as to permit accurate correlation and integration thereof and such as to obtain an indication which is very clear and readily interpreted. In particular, the transducer means has a directional sensitivity such that reflected ultrasonic waves are received at each location through a wide angle with waves reflected from any point within the region under examination being received at several locations. Further, the directional sensitivity is such that the region inspected has a long dimension in a direction parallel to a line through the reception locations and means are provided for limiting the effective directional sensitivity of the transducer means to limit the region to a relatively short dimension in a direction transverse to the long dimension. This feature, as indicated above, is particularly important in an ultrasonic system used to inspect a body such as a living body which is non-homogeneous with reflecting interfaces being distributed throughout the entire body. With this feature, it is possible to examine a narrow slice of the body and to obtain an indication which can be readily interpreted and from which a reliable diagnosis can be obtained. It is noted that in other types of systems such as in radar systems, no similar problem is presented, since the atmosphere between the antenna and the reflecting surfaces is essentially homogeneous. As a result, the directional sensitivity in a radar system can be wide in both directions and, in fact, should be wide in both directions in order to permit examination of the wide area of the earth's surface. The ultrasonic system as thus far described develops a cross-sectional or "B-scan" indication which is quite different from the plan view indication obtained with radar systems.

Another very important feature of the transducer means of the invention is in the limitation of the size of the reception locations to an area having a transverse dimension of the same order of magnitude as 10 wavelengths or less at the frequency of the transmitted energy. This feature is very important in minimizing phase distortions and in obtaining an accurate correlation of the received signals.

FIGS. 6–8 illustrate the construction of the transducer 12 which incorporates all of the above features.

The transducer 12 comprises a piezoelectric crystal 62 having a lower or front face 63 and an upper or back face 64 on which thin electrodes are formed. The back face 64 is cemented to a backing member 65 within a metallic housing 66. The electrode on the front face 63 is connected electrically to the housing 66 while the electrode on the back face 64 is connected through a lead 67 to a central conductor of a coaxial line fitting 68 at the upper end of the housing 66.

A special lens member 7 is provided having a planar face 71 which is cemented to the front face 63 of the crystal 62 and which may also be cemented to portions of the backing member 65 extending to a plane flush with the front crystal face 63 and the end of the housing member 66. The lens member 70 has an opposite face 72 which is convex as viewed in cross-sections parallel to the direction of movement and normal to the front face 63 of the crystal 62. With this shape, the ultrasonic waves are transmitted and received through a wide angle to receive signals at a large number of locations and to increase the resolution capabilities of the system when such signals are correlated and integrated. In addition, the opposite face 72 is concave as viewed in cross-sections transverse to the direction of movement and normal to the front face 63, as shown in FIG. 8. The purpose of the concave cross-sectional shape is to focus the ultrasonic energy into a narrow beam and to limit the region from which waves are received to a relatively short dimension in a direction transverse to the long dimension. By way of example, the radius of curvature may be chosen to obtain a focal point at an intermediate depth or range dimension, taking into consideration the relative velocities of travel of ultrasonic waves in the lens member 70 and in the medium into which the waves are transmitted.

It will be noted that with this construction, the ultrasonic waves are transmitted into and received from a fan-shaped region, very thin in one direction and broad in the other.

The crystal 12 has a small transverse dimension, preferably on the order of 10 wavelengths or less at the frequency of operation, the ten wavelengths being measured according to the velocity of travel of ultrasonic waves in the medium into which the waves are propagated. With this feature, the phase of the waves arriving at the transducer can be accurately measured and the transducer can be considered as essentially a point source and a point of reflection.

FIG. 9 illustrates a modified transducer assembly 80 in which 10 transducers 81–90 are supported in spaced relation fro ma bar 92 to extend into a pool of a liquid 93 contained on the surface of a body 94 by a wall of a surrounding member 95. The transducers 81–90 can be operated in a stationary position to transmit and receive from ten different locations. However, as diagrammatically illustrated, the transducers 81–90 are movable by a scanning mechanism 96 which preferably moves the bar 92 back and forth through a distance slightly less than the spacing between the transducers. With this arrangement, the number of locations at which the energy is received is greatly increased but by using a plurality of transducers, the required movement is small.

The scanning mechanism 96 is arranged to supply a position signal through a line 97 to an electronic energizing and indicating system 98, shown in FIG. 10. The transducers 81–90 are respectively connected to an oscillator 100 through gates 101–110 and through gates 111–120 to a receiver amplifier 122. The output of the amplifier 122 and a signal from the oscillator 100 are applied to a synchronous demodulator 124 the output of which is applied to the intensity control electrode of a cathode ray tube 126 having a screen 127.

The beam of the cathode ray tube 126 is deflected by horizontal and vertical deflection circuits 129 and 130. The horizontal deflection circuit 129 is connected to the output of a mixer circuit 132 having one input connected to a horizontal position circuit 133 and having a second input connected to the line 97 from the scanning mechanism 96. The vertical deflection circuit 130 is connected to a vertical sweep circuit 134.

A clock 135 is provided for operating the gates 101–120 and for applying control signals to the horizontal and vertical sweep circuits 133 and 134. In a preferred manner of operation, the gates 101–110 are opened in sequence for short time intervals and at a rapid rate. By way of example, the gates 101–110 may be opened sequentially for two microsecond intervals at a rate of 4000 per second, wave trains being thus applied to each of the transducers 81–90 at the rate of 400 per second. With the oscillator 100 operated at 5 mc., ten cycle wave trains are thus applied to the transducers 81–90. The gates 111–120 are opened after operation of the respective gates 101–110 for relatively long time intervals corresponding to the depth limitations of the region of the body which is inspected.

The clock 135 applies a triggering signal to the vertical sweep circuit 134 in synchronism with the pulsing of the transducer to produce a vertical trace on the screen 127. The clock 135 also applies a signal to the horizontal position circuit 133 which shifts the position of the trace in proportion to the spacing between the transducers 81–90. At the same time, the horizontal position of the trace is modified at a relatively slow rate by the signal on line 97 from the scanning mechanism 96. Thus as the transducers 81–90 are pulsed consecutively, ten traces are produced in spaced relation across the screen 97. When the transducers are again pulsed, another ten traces are produced, respectively spaced from the first series of ten traces by a distance equal to one-tenth the distance between the adjacent traces of the first series of ten traces. Accordingly, after 100 traces, a complete indication is obtained. The transducers may then be moved to the initial position, after which another cycle is initiated.

As an alternative, an interlaced operation may be used with the respective distances between the first, second, third, fourth and fifth series of traces being equal to one-fifth the distance between the traces of each series, with the respective distances between the fifth and sixth series of traces being one-tenth the distance between the traces of each series and with the seventh, eights, ninth and tenth series of traces being produced during a retrace movement of the transducers at a spacing of one-fifth the distance between the traces of each series, so as to respectively fall between the traces of the fourth and fifth series, the third and fourth series, the second and third series and the first and second series.

With either arrangement, the indications produced on the screen 97 are similar to the indications produced on the film 17 of the embodiment shown in FIG. 1. The indication so produced may be projected through a lens 136 to a film 137 moved from a supply reel 139 to a take-up reel 140, the film 137 being stationary during each complete scanning operation and being indexed at the end of each scanning operation. After exposure, the film 137 is processed in a manner similar to the processing film 17 as above described, to produce a final output indication.

It is noted that each of the transducers 81–90 may preferably have a construction similar to that of the transducer 12, to transmit into and received from overlapping fan-shaped regions of the body 94.

It is also noted that the scanning arrangement of FIGS. 9 and 10 is not limited to use in conjunction with a correlating and integrating system but may be used to directly produce an output indication on the screen 97. In such an application, the transducers 81–90 should be constructed to provide narrow beam operation.

Referring to FIG. 11, reference numeral 142 generally designates a signal developing and storage portion of a modified ultrasonic system, operative for producing a cross-sectional view in a plane generally parallel to a surface of a body 143, which may be referred to as a C-scan indication. In this arrangement, a transducer 144 similar to the transducer 12 extends into a pool of a liquid 145 which is contained on the surface of the body 143 by a wall of a surrounding member 146.

As diagrammatically illustrated, a scanning mechanism 148 is provided for moving the transducer 144 in two mutually orthogonal directions, designated as "X" and "Y." Preferably, the transducer is moved at a relatively rapid linear rate in the X direction to a limit of travel after which it is moved a short distance in the Y direction, the transducer 144 being then moved back in the X direction at the same rapid linear rate to the initial position. The transducer is then again moved a short distance in the Y direction and the cycle is repeated so that in a given interval of time, a region of the body is scanned.

An oscillator 150 is connected through a gate 151 and through an amplifier 152 to the transducer 144, the gate being periodically opened for a short time interval by a signal applied from a clock 153. By way of example, the oscillator 150 may be operated at 5 mHz. and the gate 151 may be opened for one microsecond intervals to apply wave trains to the transducer having a five cycle duration.

Received signals are applied through an amplifier 155 and through a gate 156 to a synchronous demodulator 157 which applies an output signal through an amplifier 158 to the intensity control electrode of a cathode ray tube 160. A reference signal is applied to the synchronous demodulator 157 from the oscillator 150. The gate 155 is opened for a short time interval beginning at a time which is accurately timed with respect to the opening of gate 151 and which corresponds to the desired depth at which a cross-sectional indication is to be obtained. By limiting the duration of the times when the gates 151 and 156 are opened, an indication can be obtained corresponding to a cross-sectional plan view of a very narrow slice of the body.

The electron beam of the cathode ray tube 160 is deflected vertically by a deflection circuit 161 operated in synchronism with the movement of the transducer 144 in the X direction, to produce a vertical trace on the screen 162 of the cathode ray tube 160. The trace so produced is projected by a lens 163 to a film 164 which is moved from a supply reel 165 to a take-up reel 166 operated by a motor 167. A synchronizing connection 168 is preferably provided between the motor 167 and the scanning mechanism 148 such that the film is stationary during each scanning movement in the X direction, the film being moved a certain distance during each indexing movement in the Y direction.

With this arrangement, patterns are produced on the film 164 which are substantially of the same form as those produced on the film 17, except in two respects. In particular, since the signals are all obtained from the same range, the patterns received from all points are of the same form. Secondly, the pattern produced with the system of FIG. 1 has a slight curvature as shown in FIG. 3, due to the fact that as the transducer moves away from a position at which it is normal to the target, the distance from the transducer to the target is increased and the position of the indication in the range direction is shifted downwardly. It should be noted, however, that this same effect is present in the arrangement of FIG. 11. It does not affect the indication so long as the wave train and particularly the transmitted wave train is of sufficient duration to produce the desired number of cyclical variations in each pattern.

The film 164 is processed by a system 170 shown in FIG. 12, which is similar to the system shown in FIG. 2.

In the processing system 170, the film 164 is moved from a supply reel 171 to a take-up reel 172 which is driven by a motor 173. The film 164 is exposed to parallel light coherent light rays developed from a laser light source 174 and applied through lenses 175 and 176. Light rays passing through the film 164 pass through a first cylindrical lens 177, a second cylindrical lens 178 and a spherical lens 179 to pass through a slit 180 between a pair of plates 181 and 182 and to impinge upon a film 184 which travels from a supply reel 185 to a take-up reel 186, driven by the motor 173. This system is thus similar to that shown in FIG. 2, except that the cylindrical lens 177 is substituted for the conical lens 45. The cylindrical lens 177 is usable since all reflection patterns are produced on the film 164 from a constant distance from the transducer 144.

Referring now to FIG. 13, reference numeral 190 generally designates another modified form of transducer arrangement, according to the invention. In the transducer arrangement 190, four transducers 191–194 are disclosed in equi-angularly spaced relation on a wheel 195 and at equal radial distances from the wheel axis. The wheel 195 is supported for rotation about its axis by a structure 196 which rests against the surface of a body 197 being examined and which includes a cylindrical wall 198 and a top wall 199. An electric motor 200 is mounted on the top wall 199 and is mechanically coupled to the wheel 195 for rotating the wheel while a commutator assembly 202 is disposed on the wheel 195 and under the top wall 196. Rotatable elements of the commutator assembly 202 are connected through a switch unit 203 to the transducers 191–194 while stationary elements thereof are connected to a cable 204. A stationary plate 206 is disposed in engagement with the surface of the body 197 under the wheel 195 and has a peripheral cylindrical surface 207 disposed in spaced facing concentric relation within an internal cylindrical surface 208 of a ring 210 which is affixed inside the wall 198. The space inside the structure 196 is partially filled with a suitable liquid to provide an ultrasonic wave couplant between the transducers and the surface of the body 197. The transducers 191–194 are arranged to transmit ultrasonic waves between the surfaces 207 and 208 and into the body 197 and to receive waves reflected from interfaces within the body. Each transducer is arranged to operate in a tangential plane to focus the energy at a point which is preferably slightly above the surface of the body 197 but which may be slightly below. The purpose of so focusing the energy is to permit use of a crystal of large area, to provide a beam which fans out at a wide angle and to provide a restricted point from which the energy is transmitted and received. In radial planes, each transducer operates to focus the energy into a narrow beam which preferably has a focal point at an intermediate depth of the portion of the body which it is desired to examine.

FIG. 14 shows the structure of one of the transducers 191, the construction of the other transducers 192–194 being substantially the same. The transducer 191 comprises a piezoelectric crystal 212 having a lower or front face 213 and an upper or back face 214 on which thin electrodes are formed. The back face 214 is cemented or otherwise secured to a backing member 215 within a metallic housing 215. The electrode on the front face 213 is connected electrically to the housing 216 while the electrode on the back face 214 is connected through a lead 217 to a central conductor of a coaxial line fitting 218 at the upper end of the housing 216.

A special lens member 220 has a planar face 221 which is cemented to the front face 213 of the crystal 212. An opposite face 222 of the lens member 220 is concave about a short radius, as viewed in cross-sections extending tangentially, parallel to the axis of rotation of the wheel 195. With this shape, the ultrasonic waves are focused at a point. which is preferably slightly above the upper surface of the body 197, to obtain the above-described advantage. The face 222 is also concave about a relatively long radius, as viewed in cross-sections parallel to a radial plane through the axis of rotation of the wheel 195, to thereby focus the energy into a relatively narrow beam from the portion of the body 197 being examined. Accordingly, the ultrasonic waves are transmitted into and received from a fan-shaped region within the body 197, very thin in one direction and broad in the other.

FIG. 16 is a schematic diagram illustrating the transducer arrangement 190 embodied in an electronic signal developing and storage portion of a modified ultrasonic system according to the invention.

The commutator 202, which may preferably be of a type such as used in video tape recorders, has four segments 225–228 which are sequentially engageable by a fixed contact 229. Each of the segments 225–228 extends through approximately 90 degrees. The segment 225 is connected to the transducer 191 while segments 226, 227 and 228 are connected to movable contacts 230, 231 and 232 which are selectively engageable with fixed contacts connected to the transducers 192, 193 and 194. Thus as the wheel 195 is rotated, the transducers 191–194 are sequentially connected to the fixed contact 229 which is connected to the cable 204. With this arrangement, a region of the body is inspected having the shape of an arcuate segment of a thin cylindrical wall, with an arcuate length of approximately 90 degrees. If desired, the switches 230 and 232 may be positioned so that transducer 193 is connected to segments 225 and 226 while the diametrically opposite transducer 193 is connected to segments 227 and 228. With this arrangement, the arcuate length of the region inspected is extended to 180 degrees. As a third alternative, the switches 230, 231 and 232 may be positioned so that all four segments are connected to the transducer 191, extending the arcuate length of the region inspected to a full 360 degrees.

To energize the transducers, an oscillator 234 is connected through a gate 235 and an amplifier 236 to the cable 204, the gate 235 being periodically opened for a short time interval by a signal applied from a clock 237. By way of example, the oscillator may be operated at 5 mc. and the gate 235 may be opened for a time interval of 4 microseconds at a rate of 4000 times per second, so that each wave train transmitted by the transducer assembly will contain 20 cycles at the frequency of 5 mc. Received signals are applied through an amplifier 239 and a gate 240 to a mixer 241 which is supplied with a signal from a local oscillator 242. The gate 240 is opened for a time interval corresponding to the depth of the region which it is desired to examine. The mixer 241 converts received signals to a lower frequency. By way of example, the oscillator 242 may be operated at 4 mc. so that a 1 mc. output signal is obtained from the mixer 241.

The output of the mixer 241 is applied through an IF amplifier 243 to a synchronous demodulator 244 to which a reference signal is supplied through a band pass filter 245 from a mixer 246. The mixer receives signals from the oscillators 234 and 242 and with the oscillators 234 and 242 operated at 5 mc. and 4 mc., respectively, a 1 mc.

reference signal is applied to the synchronous demodulator 244.

The output of the synchronous demodulator 244 is applied through an amplifier 248 to the control electrode of an input section 249 of a scan conversion tube 250 which has an output section 251. The scan conversion tube 250 comprises an intermediate plate 252 which is scanned by an electron beam developed in the input section 249, to develop a charge pattern on the plate 252 corresponding to the signal applied to the intensity control electrode of the input section 249, the signal in this case being the output of the synchronous demodulator 244 which is applied through the amplifier 248. The plate 252 is then scanned by an electron beam developed in the output section 251 to an electronic processing system 254.

The processing system 254 has an output connected to a display cathode ray tube 255 and a second output may be applied to a video tape recorder 256. The processing system 254 is also arranged to control the deflection of the beam in the output section 251 of the scan conversion tube 250 and also the deflection in the display tube 255.

Horizontal and vertical deflection circuits 257 and 258 are provided for controlling deflection in the input section 249 of the scan conversion tube 250. The horizontal deflection circuit 257 receives a sawtooth signal from a sweep circuit 259 which is controlled from a control pulse generator 260 mechanically connected to the motor 200 and the wheel 195. Preferably, the sweep circuit 259 may be operated twice during each revolution of the transducer wheel 195 so that with the transducers 191–194 being respectively connected to the commutator segments 225–228, two complete "frames" or scans of the same region of the body 197 are presented in side-by-side relation on the plate 252. The vertical deflection circuit 258 is connected to a vertical sweep circuit 261 which is controlled from the clock 237 to be operated at a pulsing rate. Signals may preferably be applied from the control pulse generator 260 and from the clock 237 to the processing system 254.

The general operation of the processing system 254 will be best understood by first considering FIG. 18 which shows two forms of charge patterns 263 and 264 produced on the plate 252 of the scan conversion tube 250 under certain conditions of operation, as follows:

(1) A transmitted wave train having a duration of 2 microseconds and an effective frequency of 1 mHz., obtained in the illustrated system from the heterodyne arrangement wherein the transducer frequency of 5 mHz. and the local oscillator frequency of 4 mc. are applied to the mixer 241. Each wave train contains two cycles at the effective frequency.

(2) A pulse rate of 4000 pulses per second.

(3) A transducer velocity of approximately 80 inches per second, which is obtained by locating the transducers 2 inches away from the wheel axis and rotating the wheel at 360 r.p.m.

The upper pattern 263 is produced in response to a point target in the body, 3 inches from the plane of movement of the short-radius focal point of the transducers, while the lower pattern 264 is produced at a 4 inch distance. It is here noted that all energy travelling between the crystal 212 and the focal point take the same length of time to travel therebetween, regardless of the angle of transmission. Hence the focal point may be considered as a point source and as a point location for reception, in determining the operation of the system.

Under the above conditions, the width of the region scanned is approximately 3 inches and the transducer is pulsed at a rate of approximately 50 pulses per inch of travel. Accordingly, if the patterns were produced at the same scale as in the region of the body examined, the width of the upper pattern would be approximately 2.2 inches and the width of the lower pattern would be approximately 2.5 inches. The actual size of the charge patterns produced on the plate 252 of the scan conversion tube 250 may be less, depending upon the size of the plate of the tube which is used. In this connection, it is desirable to develop two complete frames or scan patterns on the plate 252 in side-by-side relation, to permit processing of one while the other is being produced. Further, it is desirable that there be a substantial spacing between the patterns to permit processing of each pattern independently of the other. Preferably the spacing is on the order of one-half the width of the patterns. These features are accomplished by operating the horizontal sweep circuit 259 at a rate (12 per second) which is equal to one-half the frame rate (24 per second), and by developing a step in the horizontal sawtooth signal which is generated by the sweep circuit 259.

It may be assumed that one complete scanning pattern has been produced on the left-hand portion of the plate 252 while another is being produced on the right-hand portion thereof. In the processing of the pattern, the scanning spot produced in the read-out section 251 of the scan conversion tube 250 has an oscillatory generally horizontal movement such as to sense the existence of a pattern produced by a point target and also to sense the existence of the appropriate charge pattern for a point target. By way of example, the scanning spot may start at a starting point at an upper left-hand portion of the left-hand pattern and move to the left and downwardly along a curved path, thus back to the right, almost retracing the same path but arriving at a second point slightly below the starting point, thence to the right and downwardly along a curved path, and thence back to the left almost retracing the path and arriving at a third point slightly below the second point. Such movement of the scanning spot is illustrated diagrammatically by dotted line 265 in FIG. 18.

Such oscillatory scanning movement continues until the lower end of the pattern is reached, after which another such scanning operation is initiated, starting at a point spaced to the right from the starting point of the first scan.

The curved path of movement corresponds to the path occupied by the charge pattern of a point target. To determine whether the appropriate charge distribution exists along the path, the rate of movement of the scanning spot is automatically varied to produce a video signal having a certain frequency. If both conditions exist during an oscillatory movement of the scanning spot, i.e. if there is a varying charge distribution along the path and if that charge distribution corresponds to the charge distribution of a point target, an output signal is developed which causes a bright spot to be registered along an appropriate point of a scan line on the display cathode ray tube 255.

Referring now to FIG. 17, the processing system 254 comprises horizontal and vertical deflection circuits 267 and 268 having inputs coupled to the outputs of mixer circuits 269 and 270. The mixer circuit 269 has one input connected to an output of a horizontal sweep circuit 271 which has an input connected to an output of the control pulse generator 260. The horizontal sweep circuit 271 supplies a sweep signal of the same form as that supplied by the horizontal sweep circuit 259 for the input section 249 of the scan conversion tube 250, except that it is generated in a shifted phase relation such that one scanning pattern is processed while another is being developed.

One input of the mixer 270 is connected to an output of a vertical sweep circuit 272 which has an input connected to receive a clock pulse from the clock 237. An output of the vertical sweep circuit 272 is applied to a vertical deflection circuit 273 for the display cathode ray tube 255. A horizontal deflection circuit 274 for the display tube 255 has an input connected to a horizontal sweep circuit 275 which has an input connected to an output of the control pulse generator 260, the horizontal sweep circuit 275 being operated at the frame rate.

A second input of the mixer 269 is connected to the output of a modulator circuit 277 which has an input connected to an output of a square root wave generating circuit 278 which receives a signal from an oscillator 279. In order to move the scanning spot at a speed such as to generate a sinusoidal signal from a charge pattern developed in response to a point target, it is necessary to have a scanning signal which varies approximately in accordance with a square root function, which is generated by the square root wave generating circuit 278. This signal must vary in amplitude in accordance with range and the modulator circuit 277 is controlled from a range dependent amplitude control circuit 280 having an input connected to receive a clock pulse from the clock 237.

To obtain the required curvature in the path of movement of the scanning spot, it is necessary that the spot be deflected vertically while it is deflected horizontally. When the horizontal deflection circuit varies as a square root function, the required vertical deflection signal is a triangular wave and a triangular wave generating circuit 282 is provided having an input connected to the output of the oscillator 279 and having an output connected to the mixer 270. The required amplitude of the triangular wave signal is constant, regardless of range.

To prevent generation of extraneous signals, a blanking circuit 283 is provided having an input connected to the oscillator 279 and having an output connected to the beam control of the output section 251 of the scan conversion tube 250.

An output video signal developed from the scan conversion tube 250 is applied through an amplifier 284 and a band pass filter 285 to a detector 286 the output of which is applied through an amplifier 287 to the intensity control electrode of the display cathode ray tube 255. As above indicated, a video signal in a certain frequency range is developed when the scanning path traverses a pattern having a charge distribution corresponding to that produced in response to reflections from a point target. The band pass filter 285 is tuned to the required frequency range so that when the pattern is detected, a signal is developed by the detector 286 which is applied through the amplifier 287 to register a bright spot on the screen of the display cathode ray tube 255. By way of example, the oscillator 279 may be operated at a frequency of 320 kc. and the amplitude of the oscillatory sweep signal may be such as to produce 24 cycles of the charge pattern signal in response to each cycle of the signal derived from th oscillator 279. Thus the band pass filter is tuned to 7.68 mc. Preferably, to allow for variations in operating conditions, the band pass filter 285 may be tuned to respond over a wide range, for example from 7 to 8.5 mc.

To obtain a permanent record of output indications obtained and also to permit repeated display of indications of interest, the video tape recorder 256 is provided which has one input connected to the output of a mixer 290. Mixer 290 has one input connected to an output of the amplifier 287 and a second input connected to an output of a synchronizing pulse generator 291, which receives a clock pulse from the clock 237. A second input of the video tape recorder is connected to receive signals from the control pulse generator circuit 260 which may be used to control the synchronized rotation of the recording head or heads in the video tape recorder 256 and which may also be recorded on a separate control track of the tape, to control the rotation of heads during reproduction.

The systems of FIGS. 16 and 17 can be used without developing a varying charge pattern in response to phase changes sensed by the synchronous demodulator 244, and can depend only upon the sensing of the curved or dished shape of the pattern produced in response to scanning of a point target. In the signal developing and storage system of FIG. 16, the switch at the input of amplifier 248 can be selectively operated to connect to the output of a pulse forming circuit 293 having an input connected to the output of the gate circuit 240. The pulse forming circuit 293 operates to generate short pulses in response to echo signals which are applied through the amplifier 248 to the intensity control electrode of the input section 249 of the scan converter tube 250. With this arrangement, the curved or dished pattern is produced in response to scanning of a point target. In the processing system of FIG. 17, a switch 292 may be closed to bypass the band pass filter 285, and the detector 286 simply operates as an integrating circuit to develop a large output signal when the video signal has a large amplitude over a period of time, as is the case when the scanning pattern of the spot in the output section 251 of the scan conversion tube 250 registers with a pattern produced by a point target.

Figure 18:
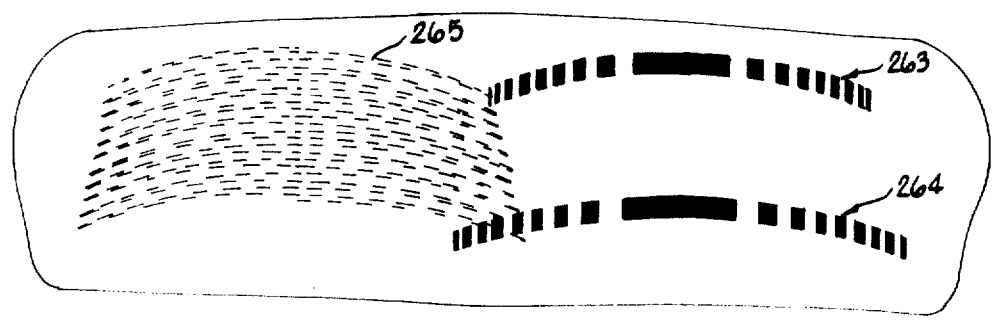
FIG. 18 is a view illustrating indication patterns, for explanation of the operation of the system of FIG. 16.

In the patterns produced in response to scanning of a point target as shown in FIG. 18, the spacing of the maximum and minimum charge areas from the center line of the pattern increases according to a square root function, and the spacing from one maximum or minimum charge area to the next maximum or minimum charge area decreases in proportion to the distance from the center line. To convert such variations into a sinusoidal variation at a certain frequency, it is necessary that the rate of change of the oscillatory scanning signal should decrease according to a square root function as the amplitude thereof increases in either a positive or a negative direction. To obtain the required rate of change, the instantaneous value of the signal must increase according to the square root of time and it must decrease in the same fashion after reaching a maximum value.

Figure 19:
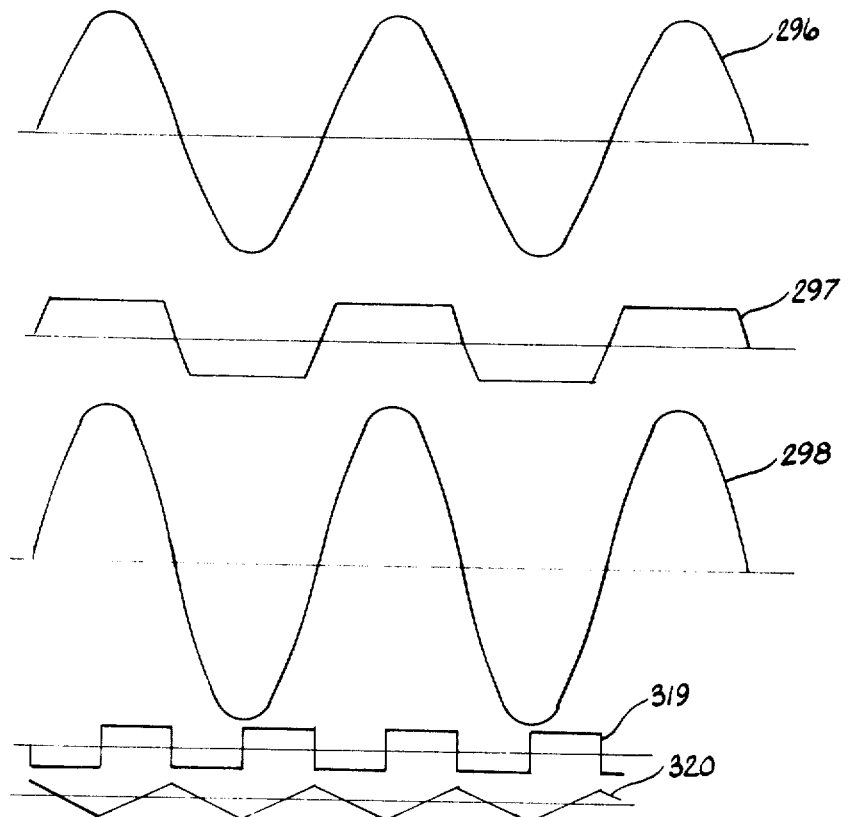
FIG. 19 is a view illustrating waveforms produced at various points of the system of FIG. 16.

A close approximation to the required form of signal can be obtained by the addition of a squarewave signal to a sine wave signal in phase with the squarewave signal having a peak amplitude approximately equal to 0.3 that of the sine wave signal. As shown in FIG. 19, a sine wave signal 296 produced by the oscillator 279 is clipped to develop a signal 297 which is added to the sine wave signal 296 to produce a signal 298 which closely approximates a squarewave signal over a substantial portion of each quarter cycle, to within approximately 2% from 10 to 75 degrees, 105 to 170 degrees, 190 to 255 degrees and 285 to 350 degrees.

Figure 20:
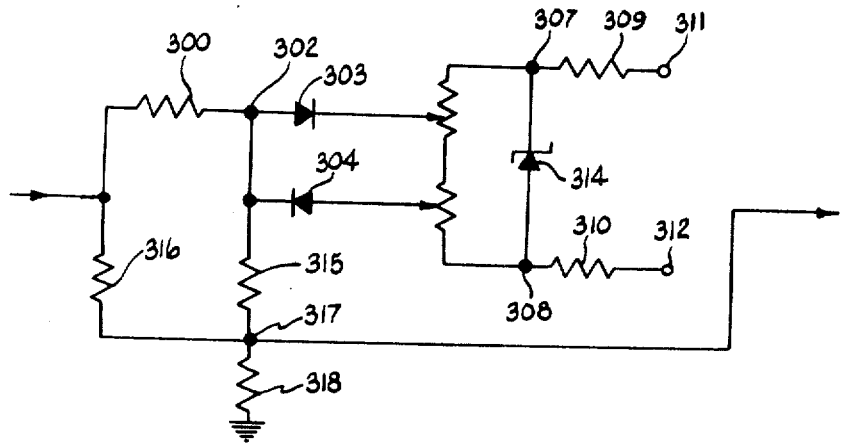
FIG. 20 is a circuit diagram of a square root wave generating circuit of the system of FIG. 17.

FIG. 20 illustrates a circuit arrangement for producing the square root signal. In this circuit, an input signal from the oscillator 279 is applied through a resistor 300 to a circuit point 302 which is connected through diodes 303 and 304 to the movable contacts of potentiometers 305 and 306. Potentiometers 305 and 306 are connected between ground and circuit points 307 and 308 which are connected resistors 309 and 310 to positive and negative power supply terminals 311 and 312, with a Zener diode 314 being connected between circuit points 307 and 308. The potentiometers 305 and 306 are adjusted so that the diodes 303 and 304 conduct on the positive and negative half cycles to limit the voltage at the circuit point 302 to the value approximately 0.3 of the peak value of the sine wave signal applied from the oscillator 279. The signal developed at terminal 302 and the input signal are applied through resistors 315 and 316 to a circuit point 317 which is connected through a resistor 318 to ground. With this arrangement, a signal is developed at circuit point 317 such as indicated by reference numeral 298 in FIG. 19.

Figure 21:
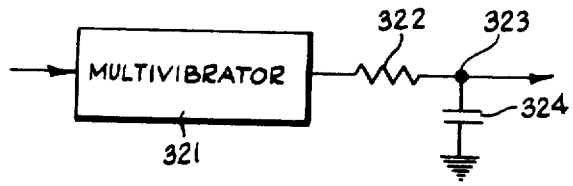
FIG. 21 is a circuit diagram of a triangular wave generating circuit of the system of FIG. 17.

To develop the curved or dished shape of the scanning pattern, the downward deflection must be proportional to the delay distance which in turn is proportional to the square of the distance from the center line of the deflection pattern. The distance from the center line in turn varies as the square root of time so that the required downward deflection varies as a linear function of time and the required waveform is triangular. With reference to FIG. 19, a squarewave 319 is developed at a frequency equal to twice the frequency of the sine wave developed by the oscillator 279 and it is applied to a resistance-capacitance integrating circuit to develop the signal 320 having a required triangular shape. As shown in FIG. 21, a multivibrator 321 is provided having an input connected to the oscillator 279 to synchronize its operation, the multivibrator 321 being operated at twice the frequency of the oscillator 279. The output of the multivibrator 321 is applied through a resistor 322 to a circuit point 323 which is connected through a capacitor 324 to ground. The triangular waveform developed at circuit point 323 is applied to the vertical deflection circuit 268, through the mixer 270.

Figure 22:
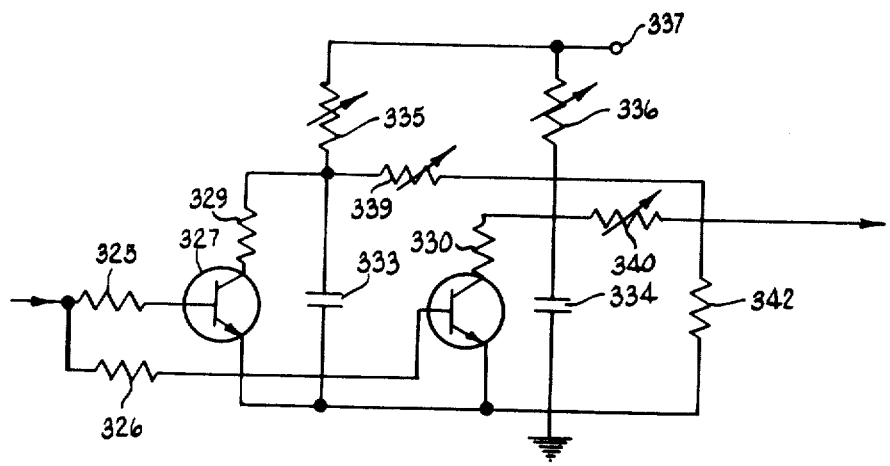
FIG. 22 is a circuit diagram of a range-dependent amplitude control signal circuit of the system of FIG. 17.

It is also necessary that the amplitude of the square root signal be increased as the range increases, to properly track patterns created from point targets and to produce the proper output in response to scanning of the charge patterns. In the illustrated system, the amplitude is increased in proportion to the square root of range. A circuit for producing the desired amplitude control signal is illustrated in FIG. 22. In this arrangement, a clock pulse is applied through resistors 325 and 326 to the base electrodes of a pair of transistors 327 and 328 having emitters connected to ground and having collectors connected through current-limiting resistors 329 and 330 to circuit points 331 and 332 which are connected through capacitors 333 and 334 to ground and through resistors 335 and 336 to a power supply terminal 337. Circuit points 331 and 332 are connected through variable resistors 339 and 340 to a circuit point 341 which is connected through a resistor 342 to ground.

In operation, the transistors 327 and 328 are rendered highly conductive by the clock pulse, to discharge the capacitors 333 and 334. The capacitors 333 and 334 then charge up through the resistors 335 and 336 to develop signals at the circuit points 331 and 332 which are applied through the resistors 339 and 340 to the circuit point 341. The rates of charge of the capacitors 333 and 334 are exponential, determined by the RC time constants, and by adjustment of the resistors 335 and 336 and the resistors 339 and 340, it is possible to obtain a voltage at the circuit point 341 which increases with time according to a square root function, to a very close approximation.

To prevent application of extraneous signals to the display cathode ray tube 255, the beam of the output portion 251 of the scan conversion tube 250 may be cut off under certain conditions of operation, by means of the blanking circuit 283. This circuit can be used to cut off the beam during either maximum amplitude portions of the oscillatory scanning signal or during minimum amplitude portions thereof, or both. During the maximum amplitude portions of the scanning signal, it may deviate from the desired square root characteristic when the square root wave generator 278 has a circuit such as illustrated in FIG. 20 and described above. It may also deviate from the desired characteristic during minimum amplitude portions. As a result, undesired extraneous signals might be developed. Further, during minimum amplitude portions of the oscillatory scanning signal corresponding to the central portion of the scanning traces, there is minimum information content available, particularly with regard to discrimination between point targets which are close together and at substantially the same range position. Thus by blanking during the minimum amplitude portions, it is possible to eliminate the effect of overlapping patterns from points close together and at substantially the same range dimension, to thereby increase resolution. This is particularly important when the system is operated to respond only to the dished shape of the pattern, without detecting the distribution of charges along the pattern, when the pulse forming circuit 293 is used in the circuits shown in FIG. 16 and when the band pass filter 285 is bypassed in the circuit of FIG. 17.

Figure 23:
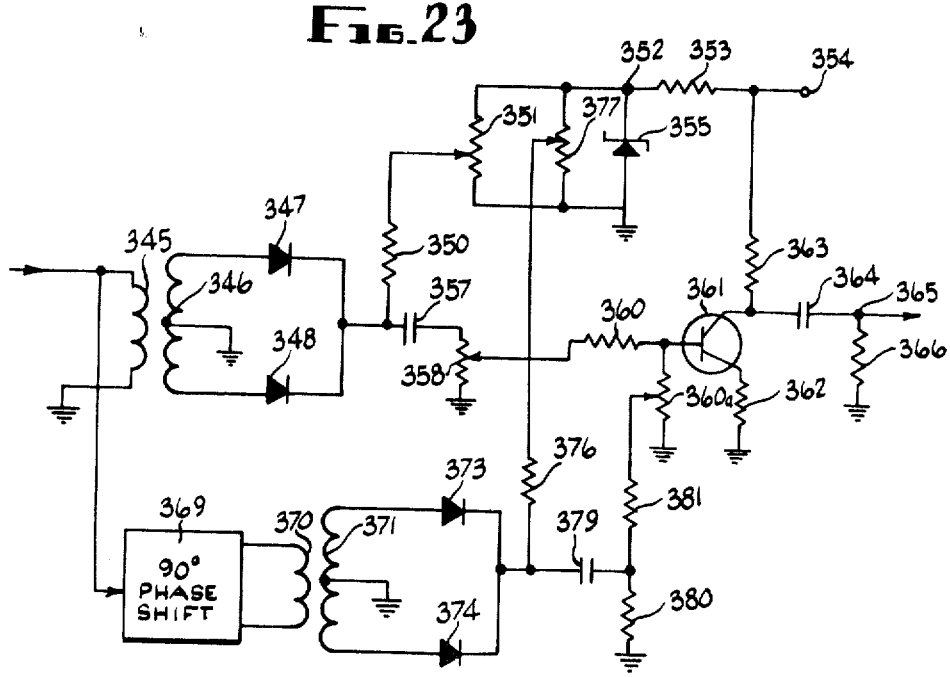
FIG. 23 is a circuit diagram of a blanking circuit of the system of FIG. 17.

The desired blanking signals are developed by the circuit shown in FIG. 23. A signal from the oscillator 279 is applied to a primary winding 345 which is inductively coupled to a secondary winding 346 having a center tap connected to ground and having end terminals connected through diodes 347 and 348 to a circuit point 349 which is connected through a resistor 350 to the movable contact of a potentiometer 351 connected between ground and a circuit point 352 which is connected through a resistor 353 to a power supply terminal 354, a Zener diode 355 being connected between the circuit point 352 and ground. When during either positive or negative portions of the oscillatory signal, the voltage exceeds the reference voltage developed at the movable contact of the potentiometer 351, a signal is developed across the resistor 350, at the circuit point 349. This signal is applied through a capacitor 257 to one terminal of a potentiometer 358 having an opposite terminal connected to ground and having a movable contact 359 connected through a resistor 360 to the base of a transistor 361. The emitter of the transistor 361 is connected through a resistor 362 to ground while the collector thereof is connected through a resistor 363 to the power supply terminal 354 and also through a coupling capacitor 364 to a circuit point 365 which is connected through a resistor 366 to ground. The transistor 361 operates as an invertor to develop negative-going signals during both positive and negative peak portions of the oscillator signal, which may be applied to the control grid of the output portion 251 of the scan conversion tube 250. Thus the tube may be blanked during maximum amplitude portions of the oscillatory signal.

To blank during minimum amplitude portions, the signal from the oscillator is applied through a capacitor 368 to a 90 degree phase shifter 369 to apply a signal to a primary winding 370 which is inductively coupled to a secondary winding 371 having a center tap connected to ground and having end terminals connected through diodes 373 and 374 to a circuit point 375 which is connected through a resistor 376 to the movable contact of a potentiometer 377 connected between ground and the circuit point 352. Circuit point 375 is also connected through a capacitor 379 and a potentiometer 380 to ground, the movable contact of potentiometer 380 being connected through a resistor 381 to the base of the transistor 361. The 90 degree phase-shifted signal reaches positive and negative peak values during minimum amplitude portions of the oscillator signal, to develop corresponding signals at the circuit point 375 which are applied to the transistor 361 and inverted to produce negative-going signals at the circuit point 365. The potentiometers 351 and 377 may be adjusted to adjust the levels at which the blanking occurs, while the potentiometers 358 and 380 may be adjusted to obtain a desired amplitude of the blanking signals.

It is noted that when the system is used only to sense the existence of a pattern along a dished path, it is not necessary to apply an oscillatory signal having a square root characteristic but another type of signal such as a pure sine wave may be applied. When a sine wave is applied, the vertical deflection signal may be a portion of a sine wave, rather than a triangular wave.

It is also noted that by using a higher effective frequency in the system and by using an adequate number of scan lines per unit azimuthal distance, the charge pattern can be produced which has a number of maximum and minimum charge areas along its length and which is substantially linear. Under such circumstances, it is not necessary to use a vertical deflection such as provided by the triangular wave generator 282. Under such circumstances, it is possible to use a simplified processing system 384, shown in FIG. 24.

In the system 384, signals are applied to an input section 385 of a scan conversion tube 386 having an output section 387 and a storage plate 388. The signals are applied from a signal developing circuit 390 which may have substantially the same form as that illustrated in FIG. 16, except that the effective frequency of he signals applied to the synchronous demodulator 244 should be relatively high so that the heterodyne frequency conversion portions of the circuit may be disabled with the output of the gate circuit 240 applied directly to the synchronous demodulator 244 and with a reference signal from the oscillator 234 being applied directly to the synchronous demodulator 244. The frequency of operation of the oscillator 234 may also be increased and, if a further increase in the effective frequency is indicated, a frequency multiplying or a heterodyne system may be used to increase the frequency of the signals applied to the synchronous demodulator 244.

In the system 384, horizontal and vertical deflection circuits 391 and 392 are provided for the output section 387 of the scan conversion tube 386, having inputs connected to horizontal and vertical deflection circuits 393 and 394 which are controlled from a clock 395. Outputs of the horizontal and vertical sweep circuits 393 and 394 are also applied to horizontal and vertical deflection circuits 397 and 398 for a display cathode ray tube 400. In this system, the horizontal deflection is at a relatively high rate, while the vertical deflection is at a relatively low rate. It is desirable to increase the horizontal speed of movement of the scanning spot as the range dimension increases, according to a square root function. To change the speed, a rate control circuit 401 is provided which may, for example, include a circuit such as shown in FIG. 22, arranged to control an amplifier to control the supply voltage to a resistance-capacitance sawtooth generating circuit in the horizontal sweep circuit 393.

The video signal developed by the scan conversion tube is applied through an amplifier 403 to a selector switch 404 which in one position is connected to a band pass filter 405. The output of the band pass filter 405 is applied through a threshold circuit 406 to one input of a coincidence gate circuit 407 and also to the input of a delay circuit 408 having an output connected to a second input of the coincidence gate circuit 407. The output of the coincidence gate circuit 407 may be connected through a selector switch 409 to the input of an amplifier 410 the output of which is applied to an intensity control electrode of the display cathode ray tube 400.

Figure 25:
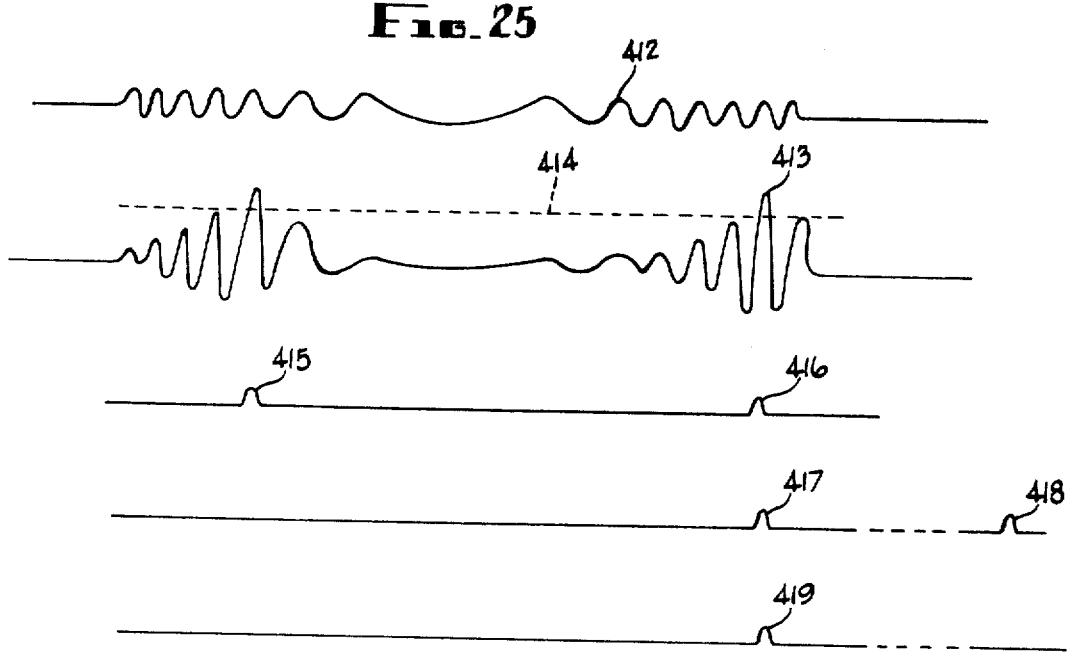
FIG. 25 is a view illustrating waveforms produced at points of the processing arrangement of FIG. 24.

The operation may be explained with reference to FIG. 25 in which reference numeral 412 indicates the charge pattern produced from the scanning of a point target. As the scanning spot traverses such a charge pattern, a video signal is developed which when applied through the band pass filter 405 develops a signal as indicated by reference numeral 413. When this signal exceeds a certain threshold value as indicated by a dotted line 414, to develop a pair of pulses 415 and 416 in response to each scanning pattern the delay circuit 408 produces a pair of pulses 417 and 418, and with pulse 417 being coincident with pulse 416, an output pulse 419 is developed by the coincidence gate circuit 407 which is applied through the amplifier 410 to the intensity control electrode of the display cathode ray tube 400, to register a spot on the screen thereof. In this system, the band pass filter 405 should have a band pass characteristic which is preferably such as to build up a voltage above the threshold value in response to a number of cycles of variations in the point target charge pattern along the order of 5.

An alternative pattern recognition system may be placed in operation by moving selector switches 404 and 409 to positions opposite the illustrated positions. The output of the amplifier 403 is then applied through the switch 404 to the input of a delay line 422 which has a plurality of taps along its length arranged in three series and connected through resistors 423 to three lines 424, 425 and 426 which are respectively connected through resistors 427, 428 and 429 to ground.

In the drawing, the taps of each series are illustrated as being spaced physically along the length of the delay line 422 in accordance with patterns which may be produced from scanning of a point target at a certain speed. It will be noted however, that the delay line need not be designed to provide a uniform delay per unit length, and the individual transmission line sections of the delay line may be varied to provide the desired delay pattern.

One series of taps could be used but three series are provided to improve the operation. It is important to consider that the charge pattern produced from scanning of a point target varies according to a phase relation of the target with respect to the path of movement of the transducer. For example, if a point target is spaced an integer number of wavelengths away from the path of movement of the transducer and if the reference signal applied to the synchronous demodulator of the system is exactly in phase with the transmitted signal, a maximum response is obtained when the transducer is normal to the target. Additional maximum responses under such conditions are obtained when the transducer is moved from the normal position to positions such as to provide an integer number of wavelengths of delay. If under such conditions, the point target were shifted a distance of one-quarter wavelength, the energy would come back in out-of-phase relation to produce a minimum response at the normal position and other minimum responses would be produced at positions spaced from the normal position through distances sufficient to provide an integer number of wavelengths of delay. The maximum responses under such conditions would be produced at positions spaced from the normal position by distances sufficient to provide delays equal to an integer odd number of half wavelengths of delay. At other spacings, other patterns are produced and it will be appreciated that an infinite number of patterns are possible.

In all of the previously described systems, variations in the exact phase relation of the pattern has substantially no effect. With the delay line 422, however, if only one series of taps were provided to respond to a pattern having a certain phase relation, there is the possibility of missing patterns having a substantially different phase relation.

The three series of taps are arranged in a three-phase relation. Thus a maximum response will be produced on the line 425 when the pattern has a 120 degree phase relation to the pattern which produces a maximum response on the line 424. Similarly, a maximum response is obtained in the line 426 when the pattern has a 240 degree phase relation to the pattern at which the maximum responsive is obtained on the line 424.

The lines 424–425 and 426 are connected through amplifiers, 431, 432 and 433 to inputs of inverter circuits 434, 435 and 436 and also to inputs of summing circuits 437, 438 and 439 having outputs connected to an OR gate 440 the output of which is connected through the selector switch 439 to the input of the amplifier 410. The output of the inverter 434 is connected to inputs of summing circuits 438 and 439, the output of inverter 435 is connected to inputs of summing circuits 437 and 439 and the output of inverter circuit 436 is connected to inputs of summing circuits 437 and 438. With this arrangement, each summing circuit responds to the amplitude of the signal produced on one of the lines 424–426, less the amplitudes of signals developed on the other two lines. Preferably, the circuits are so adjusted that each summing circuit responds to a signal value proportional to the magnitude of the signal on one of the lines less one-half the sum of the magnitudes of the signals on the other two lines.

With this arrangemnet, a uniform distribution of signal strength along the delay line produces no output from any one of the summing circuits 437–439. However, if a pattern is developed having a form corresponding to that produced from scanning a point target at a certain speed, an output will be developed from one of the summing circuits 437–439 of a large amplitude, regardless of the exact phase relation of the point target. When a signal is so developed by one of the summing circuits 437–439 it is applied through the OR gate 440 and the selector switch 409 to the amplifier 410 to increase the intensity of the spot on the screen of the display cathode ray tube 400 and to register a spot thereon.

It is noted that the arrangement using the delay circuit 408 in conjunction with the coincidence gate 407 and the circuit using the delay line 422 are not necessarily limited to a system in which the scanning spot moves at a uniform rate horizontally across the entire scanning pattern. These arrangements may, for example, be used in conjunction with a system such as shown in FIG. 17, with the oscillatory scanning system modified to provide a linear rate of movement of the spot. Thus a sawtooth generator or a triangular wave generator may be substituted for the square root wave generator 278 in FIG. 17, and an appropriate wave generator may be substituted for the triangular wave generator 282, to provide the desired dish scan configuration.

Other combinations of the features of the various embodiments are possible. Thus the transducer scanning arrangement of any of the embodiments may be used in conjunction with the circuitry and processing systems of the other embodiments. Further, it will be recognized that many of the features are not limited to use in medical applications or in ultrasonics. For example, the electronic scanning and processing systems could be used in radar systems.

It will be understood that other modifications and variations may be effected without departing from the spirit and scope of the novel concepts of this invention.

We claim as our invention:

1. In an ultrasonic system for examination of a narrow slice-like region of a body, said narrow slice-like region having a small dimension in a thickness direction and relatively large dimensions in length and width directions generally transverse to said thickness direction and to each other, ultrasonic transducer scanning means arranged for transmitting a sequence of bursts of ultrasonic energy into said region and for developing received signals in response to ultrasonic waves reflected from any reflecting points in said region, each burst of said sequence of bursts being transmitted from a transmission location to be reflected back from any reflecting point in said region to at least one reception location, said scanning means being operative during the transmission of said sequence of bursts for progressively changing the relative positional relationship of said transmission and reception locations with respect to said region in a manner such that any reflecting point within said region produces a multiplicity of received signals each timed in relation to the corresponding transmitted burst in accordance with the positional relationship of the reflecting point with respect to the transmission and reception locations, storage means for storing each of said received signals in accordance with the timed relationship thereof to the corresponding bursts and in accordance with the positional relationship of said transmission and reception locations with respect to said region, the signals received with respect to each reflecting point being stored in a certain pattern, and processing means for processing said stored received signals and for developing indications at a display area having length and width dimensions corresponding to said length and width dimensions of said region, said processing means including pattern responsive means responsive to the pattern of signals stored with respect to each reflecting point to produce an indication at each point of said display area in accordance with the correlated and integrated effect of stored received signals from ultrasonic waves reflected from a corresponding point within said narrow slice-like region.

2. In a system as defined in claim 1, said ultrasonic scanning means including movable ultrasonic transducer means, and means for effecting movement of said transducer means during the transmission of said sequence of said bursts for effecting said progressive change in the relative positional relationship of said transmission and reception locations with respect to said region.

3. In a system as defined in claim 2, said movable transducer means being arranged to both transmit bursts and to receive ultrasonic waves reflected from points in said region.

4. In a system as defined in claim 1, said ultrasonic scanning means comprising a multiplicity of ultrasonic transducers, and electronic switching means associated with said multiplicity of transducers and operative for effecting said progressive change in the relative positional relationship of said transmission and reception locations with respect to said region.

5. In a system as defined in claim 1, said narrow slice-like region being located within a substantially solid body including non-homogeneous portions between said scanning means and said narrow slice-like region.

6. In a system as defined in claim 1, said progressive change of the relative positional relationship of said transmission and reception locations with respect to said region being effected along a line generally parallel to said length direction and in alignment with said narrow slice-like region.

7. In a system as defined in claim 6, said scanning means including ultrasonic transducer means effective to receive ultrasonic waves through a wide angle.

8. In a system as defined in claim 7, means for limiting the effective directional sensitivity of said transducer means in said thickness direction.

9. In a system as defined in claim 1, said progressive change of the relative positional relationship of said transmission and reception locations with respect to said region being effected in a plane in generally spaced parallel relation to said narrow slice-like region, and gating means associated with said storage means and operative at short time intervals in timed relation to the transmission of said bursts to effect storage of only those received signals developed from reflections from said narrow slice-like region.

10. In a system as defined in claim 1, each reception location having a dimension of the same order of magnitude as 10 wavelengths or less at the frequency of the transmitted ultrasonic energy.

11. In a system as defined in claim 1, synchronous demodulator means associated with said storage means and responsive to said received signals and to a reference signal synchronized with said transmitted bursts to produce a demodulated signal having a form related to the instantaneous phase relation of received signals relative to said reference signal, said demodulated signals being stored by said storage means.

12. In a system as defined in claim 1, said storage means comprising means for storing signals on a storage medium in a positional relationship related to the positional relationship of said transmission and reception locations with respect to said region.

13. In a system as defined in claim 12, wherein said storage medium is a light-responsive film, said storage means comprising conversion means for converting signals applied thereto into a variable intensity light for storage on said film.

14. In a system as defined in claim 13, said processing means comprising a light source for passing light through said storage film, and optical means responsive to the light passed through said storage means for developing at said display area an image having an intensity pattern corresponding to the position of reflecting points within said narrow slice-like region.

15. In a system as defined in claim 14, means for positioning film at said display area to record said intensity pattern.

16. In a system as defined in claim 13, said conversion means comprising means for producing a flying spot of light, sweep means for moving said flying spot of light along a scan line in synchronism with the transmission of said bursts of ultrasonic energy, means for controlling the intensity of said spot of light in accordance with the received signals, means for exposing said storage film to the light along said scan line to produce a corresponding scan line on said film, and means for moving said film in a direction generally transverse to said scan line.

17. In a system as defined in claim 1, said progressive change of the relative positional relationship of said transmission and reception locations with respect to said region being effected along a line generally parallel to said length direction and in alignment with said narrow slice-like region, synchronous demodulator means associated with said storage means and responsive to said received signals and to a reference signal synchronized with said transmitted bursts to produce a demodulated signal having a form related to the instantaneous phase relation of said received signals relative to said reference signal, said storage means comprising means for storing said demodulated signals on a storage medium along spaced parallel lines each corresponding to the transmission of one burst with the position of stored demodulated signals along each line being in accordance with the timing thereof in relation to the transmitted bursts, the spacing of said lines corresponding to said progressive change in the relative positional relationship of transmission and reception locations with respect to said region, whereby to produce a progressive change in patterns of signals stored as the distance of a reflecting point from said scanning means increases, said pattern responsive means being arranged to respond to said distance-responsive progressive change of stored patterns.

18. In a system as defined in claim 17, wherein said storage medium is a light-responsive film, said storage means comprising conversion means for converting signals applied thereto into a variable intensity light for storage on said film, said processing means comprising a light source for passing coherent light through said storage means, and said pattern-responsive means comprising optical means responsive to the coherent light passed through said storage means for developing at said display area an image having in intensity pattern corresponding to the position of reflecting points within said narrow slice-like region, said optical means comprising means for producing an effective change in focal length with changes in distance along said parallel lines to respond to said distance-responsive progressive change in stored patterns.

19. In a system as defined in claim 1, said storage means comprising a cathode ray tube having a storage plate, electron gun means for impinging a beam on said storage plate, means for deflecting said beam to scan said plate, and means responsive to said received signals to control the intensity of said beam and to develop a stored pattern on said plate, and said processing means including means for scanning the pattern stored on said plate.

20. In a system as defined in claim 19, said cathode ray tube being a scan conversion tube wherein said pattern is stored in the form of an electrical charge pattern on said plate, and said scanning means including additional electron gun means for impinging a second electron beam on said plate, and means for deflecting said second electron beam to scan said plate and to develop signals corresponding to the charge distribution pattern on said plate.

21. In a system as defined in claim 1, said storage means including means for developing a certain pattern on a storage medium in response to reflection of ultrasonic waves from each point within said region to said multiplicity of receiving locations, and said pattern responsive means including means for comparing signals stored on said storage medium with a reference to produce an output signal in response to storage of signals according to said certain pattern.

22. In a system as defined in claim 21, synchronous demodulator means associated with said storage means and responsive to said received signals and to a reference signal synchronized with said transmitted bursts to produce demodulated signals having forms corresponding to the instantaneous phase relation of said received signals relative to said reference signal, said demodulated signals being stored by said storage means.

23. In a system as defined in claim 1, said storage means comprising means for producing a movable scanning spot, sweep means operating in synchronism with the transmission of said bursts of ultrasonic energy for moving said scanning spot along spaced scan lines respectively corresponding to said reception locations, and means for controlling the effective intensity of said spot along each scan line in accordance with the intensity of echoes received at the corresponding reception location.

24. In a system as defined in claim 23, said scanning means comprising transducer means having a directional sensitivity such that waves are received at each reception location through a wide angle, whereby signals are stored on said storage medium along curved lines in response to reflections from points in said region.

25. In a system as defined in claim 24, said pattern responsive means including means for scanning said storage medium along curved lines to develop output signals in response to signals stored on said medium corresponding to reflections from points in said region.

26. In a system as defined in claim 25, said scanning means of said pattern responsive means being arranged to scan said storage medium along curved lines at a scanning rate varying approximately according to a square root function and to develop in response to scanning of recorded signals from a point target a signal having approximately a certain frequency.

27. In a system as defined in claim 26, said processing means further including a band pass filter tuned to said certain frequency.

28. In a system as defined in claim 23, said processing means comprising first deflection means for moving a read-out scanning spot over said storage medium in a direction parallel to said scanning lines, second deflection means for moving said read-out scanning spot in a direction transverse to said scanning lines, and means for applying first and second saw-tooth signals to said first and second deflection means.

29. In a system as defined in claim 28, means for superimposing an oscillatory signal on said second sawtooth signal.

30. In a system as defined in claim 29, means for varying the amplitude of said oscillatory signal as a function of the amplitude of said first saw-tooth signal.

31. In a system as defined in claim 30, the amplitude of said oscillatory signal being varied approximately according to the square root of the amplitude of said first saw-tooth signal.

32. In a system as defined in claim 29, means for superimposing a second oscillatory signal on said first sawtooth signal.

33. In a system as defined in claim 32, said first oscillatory signal having an amplitude varying with time according to a square root function, and said second oscillatory signal having a triangular wave form.

34. In a system as defined in claim 23, said processing means including means for moving a scanning spot over said storage medium to develop a read-out signal, and display means, said pattern responsive means being responsive to said read-out signal for applying a signal to said display means.

35. In a system as defined in claim 34, said pattern responsive means including a band pass filter.

36. In a system as defined in claim 35, said pattern responsive means further including a threshold circuit coupled to the output of said band pass filter for developing a pair of pulses in response to scanning of a pattern produced from a point target, means for delaying the first of each pair of pulses for a certain time interval, and coincidence gate means responsive to coincidence of the delayed first pulse and the second pulse of each pair of pulses.

37. In a system as defined in claim 36, said pattern responsive means including delay line means, and means for applying said read-out signal to said delay line means.

38. In a system as defined in claim 37, said delay line means having a multiplicity of taps therealong arranged according to the pattern produced by scanning of a point target, and summing means coupled to said taps.

39. In a system as defined in claim 38, said taps being arranged in a plurality of series corresponding to different phases of the patterns of signals produced from scanning of point targets, a plurality of summing circuits respectively coupled to said taps of said pluralities of series, and means combining the outputs of said plurality of summing circuits.

40. In a system as defined in claim 1, said scanning means including a transducer arranged to transmit a burst of ultrasonic energy into said region and to receive corresponding reflected waves, synchronous demodulator means responsive to said received signals and to a reference signal synchronized with said transmitted bursts of ultrasonic energy to produce a demodulated signal having a form corresponding to the instantaneous phase relation of said received signals in relation to said reference signal, said storage means comprising means for producing a movable scanning spot on a storage medium, means for intensifying said spot in response to said demodulated signal, means for moving said transducer means in orthogonal directions generally transverse to the direction of propagation and reflection of said waves and means for moving said scanning spot relative to said storage medium in orthogonal directions respectively corresponding to said orthogonal directions of movement of said transducer.

41. In a system as defined in claim 1, said scanning means including a transducer arranged to transmit bursts of ultrasonic energy into said region and to receive corresponding reflected waves, and means supporting said transducer for movement about an axis in spaced generally parallel relation to the direction of propagation and reception of said waves.

42. In a system as defined in claim 41, said scanning means including at least one additional transducer supported for conjoint movement about said axis at the same radial distance therefrom as said first transducer and in angularly spaced relation to said first transducer, and switching means for rendering said transducers operative at different portions of each revolution of said transducers.

43. In a system as defined in claim 1, said scanning means including a movable transducer having a small transverse dimension, and lens means having one face coupled to a front face of said transducer and an opposite face of convex form as viewed in cross-sections parallel to the direction of movement and normal to said front face.

44. In a system as defined in claim 43, said opposite face being concave as viewed in cross-sections transverse to the direction of movement and normal to said front face.

45. In a system as defined in claim 1, said scanning means including a movable transducer having a small transverse dimension and lens means having one face of concave form as viewed in cross-sections parallel to the direction of movement and normal to said front face to focus at a point between said opposite face and said region.

46. In a system as defined in claim 45, said opposite face being concave as viewed in cross-sections transverse to the direction of movement and normal to said front face.

References Cited

UNITED STATES PATENTS

| | | | |
|---|---|---|---|
| 3,068,465 | 12/1962 | Covery 3rd et al. | 343—5 |
| 3,121,868 | 2/1964 | Hausz et al. | 343—5 |
| 3,146,441 | 8/1964 | Miller | 343—5 |
| 3,178,711 | 4/1965 | Case Jr. | 343—5 |
| 3,191,170 | 6/1965 | Lustig et al. | 343—5 |
| 3,394,585 | 7/1968 | Davey | 73—67.7 |
| 3,023,611 | 3/1962 | Howry | 73—67.9 |
| 3,077,769 | 2/1963 | Rankin | 73—67.8 |
| 3,086,390 | 4/1963 | Brown | 73—67.8 |
| 2,164,125 | 6/1939 | Sokoloff | 73—67.6 |
| 3,400,363 | 9/1968 | Silverman | 340—3 |
| 2,957,340 | 10/1960 | Rocha | 73—67.5 |
| 3,013,170 | 12/1961 | Sheldon | 73—67.5X |
| 3,284,799 | 11/1966 | Ross | 343—6 |

OTHER REFERENCES

L. J. Cutrona et al., Proceedings of the IEEE, vol. 54, No. 8, August 1966, pp. 1026–1032.

L. J. Cutrona et al., IRE Transactions on Information Theory, 1960, pp. 386–400.

C. W. Sherwin, IRE Transactions on Military Electronics, 1961, pp. 111–115.

K. Preston, Jr., et al., "Ultrasonic Imaging Using a Synthetic Holographic Technique"; Applied Physics Letters, vol. 10, No. 5, Mar. 1, 1967, pp. 150–152.

E. N. Leith et al., "Holograms: Their Properties and Uses," S.P.I.E. Journal, Oct./Nov. 1965.

RICHARD C. QUEISSER, Primary Examiner

V. J. TOTH, Assistant Examiner

U.S. Cl. X.R.

340—5

UNITED STATES PATENT OFFICE
CERTIFICATE OF CORRECTION

Patent No. 3,548,642             Dated December 22, 1970

Inventor(s) John J. Flaherty, Kenneth R. Erikson and Van Metre Lun

It is certified that error appears in the above-identified patent and that said Letters Patent are hereby corrected as shown below:

Col. 1, line 34, after "testing", insert --systems--.

Col. 8, line 22, change "not" to --no--.

Col. 10, line 32, change "7" to --70--.

Col. 20, line 11, change "257" to --357--.

Col. 22, line 45, change "responsive" to --response--.

Signed and sealed this 18th day of January 1972.

(SEAL)
Attest:

EDWARD M. FLETCHER, JR.          ROBERT GOTTSCHALK
Attesting Officer                Acting Commissioner of Patents

FORM PO-1050 (10-69)